United States Patent [19]
Lambert, Jr. et al.

[11] Patent Number: 5,025,594
[45] Date of Patent: Jun. 25, 1991

[54] METHOD AND APPARATUS FOR CONTROLLING GRINDING PROCESSES

[75] Inventors: Edward L. Lambert, Jr., Westboro; Charles B. Matson, Holden; Bernard D. Vaillette, Leominster, all of Mass.

[73] Assignee: Cincinnati Milacron-Heald Corp., Worcester, Mass.

[21] Appl. No.: 490,416

[22] Filed: Mar. 8, 1990

Related U.S. Application Data

[60] Division of Ser. No. 400,733, Aug. 29, 1989, and a continuation-in-part of Ser. No. 240,021, Sep. 2, 1988, abandoned.

[51] Int. Cl.[5] ............................................. B24B 49/00
[52] U.S. Cl. ............................. 51/165.93; 51/165.77; 51/165.87; 51/290
[58] Field of Search ................. 51/5 D, 165 R, 165.71, 51/165.77, 165.76, 165.8, 165.87, 165.9, 290

[56] References Cited

U.S. PATENT DOCUMENTS

| | | | |
|---|---|---|---|
| 2,647,348 | 8/1953 | Hahn | 51/165.8 |
| 3,344,560 | 10/1967 | Lillie . | |
| 3,535,828 | 10/1970 | Ware, Jr. et al. | 51/165.8 |
| 3,555,741 | 1/1971 | Hahn . | |
| 3,634,976 | 1/1972 | Hahn et al. | 51/165.71 |
| 3,675,517 | 7/1972 | Tadayoshi . | |
| 3,714,741 | 2/1973 | Uhtenwoldt et al. | 51/165.87 |
| 3,745,710 | 7/1973 | Hahn et al. | 51/165.87 |
| 3,809,488 | 5/1974 | Sonderegger . | |
| 4,047,338 | 9/1977 | Gormish et al. | 51/165 R |
| 4,295,301 | 10/1981 | Barth et al. . | |
| 4,570,389 | 2/1986 | Leitch et al. | 51/165.87 |
| 4,628,643 | 12/1986 | Gile et al. . | |
| 4,653,235 | 3/1987 | Farmer . | |
| 4,799,472 | 1/1989 | Tonshoff et al. . | |

OTHER PUBLICATIONS

Handbook of Modern Grinding Technology, Robt. King & Robt. Hahn; Chapters 7 & 14, Chapman & Hall, 1986.
Controlled-Force Grinding-A New Technique for Precision Internal Grinding; Robt. Hahn; Aug. 1964.

*Primary Examiner*—Maurina Rachuba
*Attorney, Agent, or Firm*—Frost & Jacobs

[57] ABSTRACT

A grinding machine is shown as including a machine base, a wheel supported by the base and carrying a rotatable superabrasive grinding wheel, a device for relatively feeding the grinding wheel and a workpiece at a feed rate along a normal force vector between the two, and an apparatus for controlling the grinding processes. The apparatus further preferably includes a force transducer mounted adjacent the wheelhead to measure the magnitude of the normal force factor occurring between the wheel and the workpiece, as well as a control device for varying the feed rate and for determining the relative wheel sharpness based upon the feed rate and the measured normal forces. The feed rate can thereby be varied in response to the determined wheel sharpness to maintain a substantially constant normal force and to optimize the grinding process. By monitoring the magnitude of the normal force factor and by determining the wheel sharpness, the grinding machine of the subject invention enables automatic conditioning of a superabrasive grinding wheel, optimization of the grinding process, and optimization of reshaping of the grinding wheel.

13 Claims, 16 Drawing Sheets

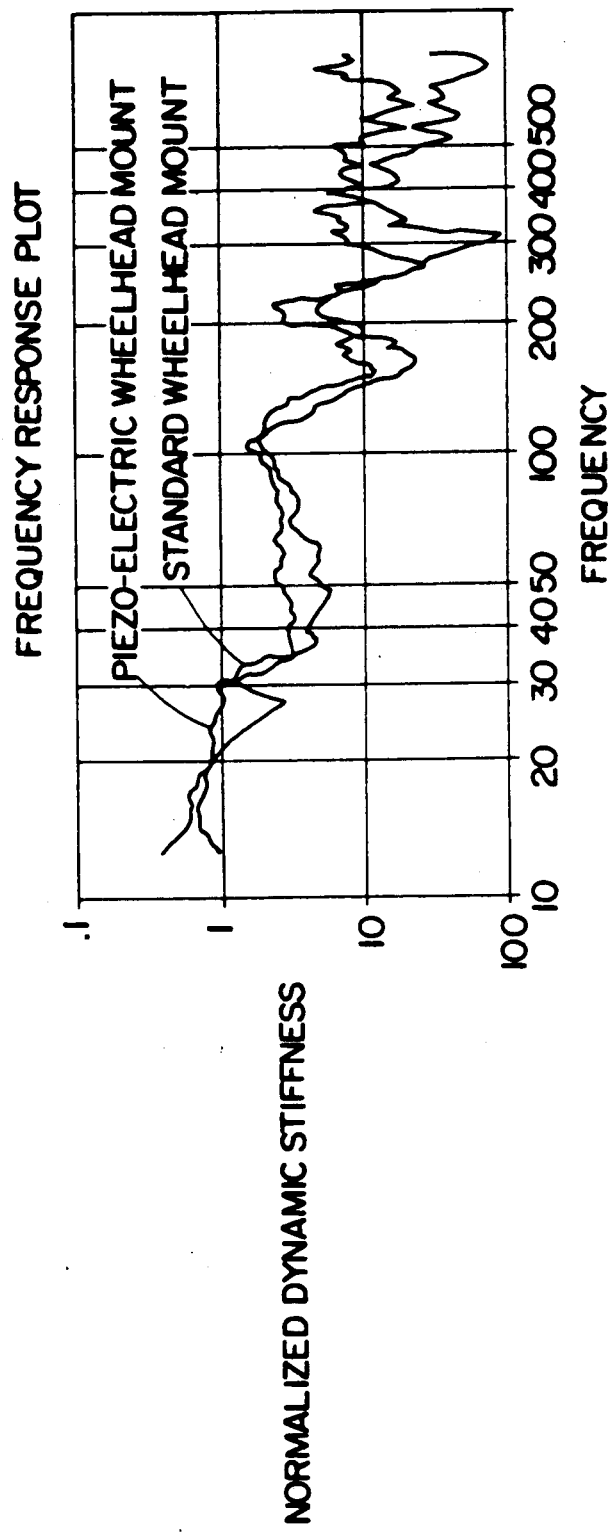

METHOD AND APPARATUS FOR CONTROLLING GRINDING PROCESSES

CROSS REFERENCE TO RELATED APPLICATION

This is a divisional of copending application Ser. No. 07/400,733 filed on Aug. 29, 1989, and a continuation-in-part application of the prior copending application entitled "Method and Apparatus for Controlling Grinding Processes," Ser. No. 07/240,021, now abandoned filed Sept. 2, 1988, in the names of the present applicants.

BACKGROUND OF THE INVENTION

1. Field of the Invention:

This invention relates generally to grinding machines employing a rotary abrasive wheel for carrying out grinding processes and, in particular, the invention relates to a machine and process for automatically controlling and optimizing grinding with a superabrasive grinding wheel by monitoring the normal forces imposed on such grinding wheel.

2. Background Information:

It is known in the grinding industry that superabrasive wheels, for example, cubic boron nitride (CBN), will tend to increase in sharpness after trueing as successive workpieces are ground, and thereby will result in higher metal removal rates for an equivalent normal force applied to the wheel, causing variations in sizing and finish.

It is well known that reconditioning (either dressing or trueing) a superabrasive wheel causes it to behave in a dull fashion, since the grit is leveled with the bonding material. If high force is applied to a dull grinding wheel, wheel damage or part burn may occur. Through a variety of grinding actions, the bonding material becomes eroded as the wheel progressively grinds workpieces, exposing new, sharp grit material, allowing room for chip formation, and effectively increasing the sharpness or metal removal ability of the wheel.

One prior art publication which discusses the superabrasive wheel and wheel dressing pattern is U.S. Pat. No. 4,653,235, in which a method is disclosed whereby a watt transducer is utilized to sense grinding wheel drive motor power consumption over a predetermined time interval at a spark-out or dwell portion of the grinding cycle, and the power level during the transition from maximum grinding power to some predetermined lower power level for re-commencing feed is monitored. If the lower power level occurs before the time interval is reached, the wheel is known to have become too sharp for the intended use, and a dressing cycle is initiated to recondition and "dull" the now too-sharp wheel. The broad concept of monitoring wheel drive motor power consumption is well known in machines using conventional grinding wheels, because it is simple and inexpensive and it is possible to determine the tangential force components from the equation: power equals $V_s$ times $F_t$, where $V_s$ is the grinding wheel speed in meters per second (m/s), and $F_t$ is the tangential force (in Newtons). Power monitors have been very useful as gap elimination devices and crash detectors, and have been used as the bases of adaptive control philosophies. However, power monitors do not lend themselves to measurement of normal force ($F_n$) which is considered imperative for accurate wheel sharpness measurement. Because the coefficient of grinding can vary considerably between dull and sharp wheels, the tangential force is not a reliable indication of actual normal forces for many working conditions commonly encountered in grinding operations. Moreover, power monitors, such as watt meters and the like, have relatively slow response times.

In evaluating wheel sharpness and controlling the grinding processes, other prior art patents have attempted to teach controlling the wheel feed rate by sensing deflection of the grinding wheel spindle U.S. Pat. Nos. 3,344,560 (Lillie) and 3,555,741 (Hahn) are two examples of devices which monitor deflection of the grinding wheel spindle to estimate grinding force. The normal force is the principal deflection causing force in the grinding process, particularly with internal grinding machines, and some prior art machines have swiveled the wheelhead to re-align the wheel with the workpiece as the grinding wheel spindle is deflected.

Internal grinding machines are particularly sensitive to deflection of the wheel-supporting spindle, which is generally of small diameter compared, for example, with external grinding machines. Controlled force grinding has been utilized in order to ensure that a known deflection of the spindle could be maintained to control the resulting grinding process. Such controlled force grinding has its problems too, however, as eccentric rotation of the workpiece, or irregularities in the workpiece stock or hardness could cause runout and prevent proper round-up of the workpiece. Heavy damping and/or increased wheel rotation velocities were required to address these problems, which created problems of their own, especially in the context of superabrasive grinding wheels.

An example of additional problems encountered includes post-dressing or post-trueing inefficiencies. As set forth in U.S. Pat. No. 4,628,643 (Gile et al.), following wheel trueing or dressing, the rotational velocity of a superabrasive grinding wheel is reduced to maintain a substantially constant grinding wheel drive power consumption. The desired power level is set by the operator, and the rotational velocity is slowly increased in subsequent grinding operations based upon the average power consumption and feed rate of the previous grind. This process slowly increases the grinding output as the superabrasive wheel becomes sharper (i.e. self-conditions) as described above.

U.S. Pat. No. 4,570,389 (Leitch) addresses post-dressing or post-trueing use of non-superabrasive wheels. The inefficiencies of this device are similar to the Gile device, as following dressing, Leitch teaches that the first grind is to be undertaken at a reduced, pre-set feed rate because non-superabrasive wheels are sharpened by the dressing process. Perceived sharpness of the wheel is calculated by monitoring changes in horsepower or normal force between two successive grinds, and over time the feed rate is increased to the point where the wheel can maintain its sharpness. The increased feed rate tends to self-sharpen the non-superabrasive wheel enough to offset the dulling effects of attrition at the optimum feed rate. However, this slow build up of the feed rate is inefficient. Moreover, this technology is not easily adapted to superabrasive grinding where in order to maintain substantially constant grinding force, the feed rate must be reduced to compensate for the self-sharpening characteristics of superabrasive wheels.

DISCLOSURE OF THE INVENTION

It is an object of this invention to obviate the above-described problems.

It is another object of the present invention to provide an improved grinding machine for use with superabrasive grinding wheels which can constantly monitor the sharpness of the grinding wheel for determining optimal feed rates required to maintain a substantially constant grinding force.

It is yet another object of the present invention to provide a grinding machine for superabrasive grinding wheels which automatically conditions the grinding wheel by monitoring the sharpness of the wheel in order to optimize the grinding process and output of the machine.

It is also an object of the present invention to provide a more accurate and dependable grinding machine utilizing superabrasive grinding wheels by accurately monitoring the normal force experienced by the grinding wheel, and by monitoring the sharpness of the wheel in order to optimize the grinding process.

It is another object of the present invention to provide a grinding machine which is capable, through monitoring of normal trueing forces, to determine the grinding wheel topography in order to optimize dressing and trueing procedures of that grinding wheel.

In accordance with one aspect of the present invention, there is provided a system in which a force transducer measures the normal force, $F_n$, seen by the grinding wheel, and is used for controlling the grinding process by methods including:

(a) controlling a constant normal force grind cycle;
(b) evaluating wheel sharpness as a function of normal force, $F_n$ and threshold force $F_{th}$:
(c) optimizing normal force contact between the grinding wheel and workpiece at all times;
(d) measuring workpiece run-out while grinding;
(e) optimizing a grind cycle; e.g., through fast, variable ramp-up infeed;
(f) sensing workpiece contact for gap elimination; and
(g) using threshold force, $F_{th}$ as a basis for adjustment to compensate for part size discrepancies.

Additionally, applicants have conceived of a control system utilizing a normal force transducer for controlling the wheel conditioning process by methods including:

(a) monitoring contact force between the wheel reshaping tool and the wheel;
(b) monitoring or mapping wheel shape geometry from dressing or trueing force conditions; and
(c) using wheel sharpness measurement to:
  (1) determine dress intervals; and
  (2) condition a wheel after trueing by controlling normal force and infeed rate.

The force measurement system for monitoring the normal force, $F_n$, acting on the wheelhead spindle, was chosen to be a very stiff structure which would not compromise the existing typical wheelhead mounting arrangement, i.e., stacked plates underneath the wheelhead which are ultimately connected to a slide system.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 3a is a frequency response plot of a load cell wheelhead mount of the subject invention and a standard wheelhead mount;

DETAILED DESCRIPTION OF THE INVENTION

Figure 1:
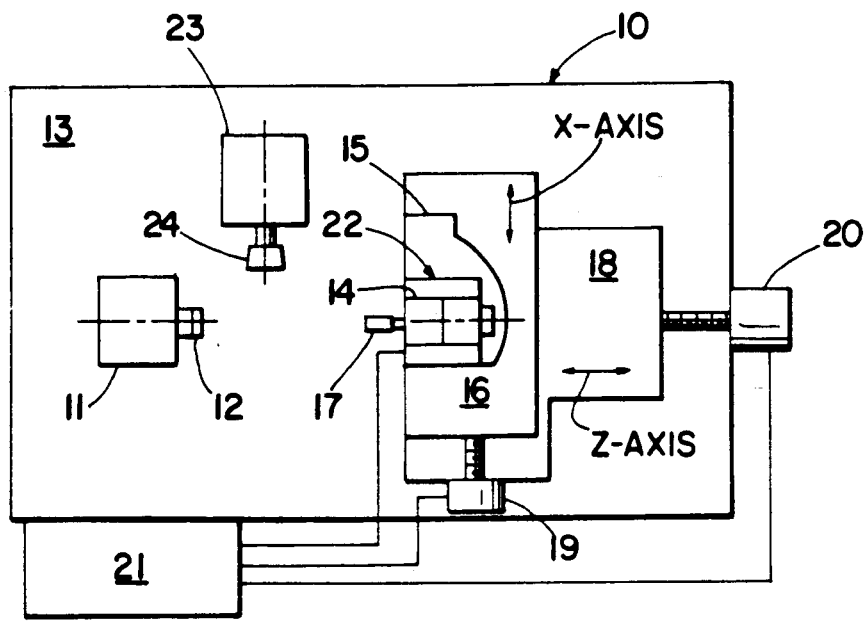
FIG. 1 is a schematic plan view of an internal grinding machine having the automatic control structure of the present invention.

Referring now to the drawings in detail, wherein like numerals indicate the same elements throughout the views, an exemplary internal grinding machine 10 is schematically depicted in FIG. 1, wherein machine 10 has a workhead 11 for supporting and driving a workpiece of revolution 12 during the grinding process. The machine 10 has a bed 13 which carries the workhead 11, and a grinding wheelhead 14 is mounted to a swivel plate 15, in turn carried by an X-axis slide 16, for moving the grinding wheel 17 radially to the workpiece 12 when performing grinding processes. The X-axis slide 16 is carried on a Z-axis slide 18, slidably mounted to the machine bed 13 for providing Z-axis movement, i.e., axially of the workpiece 12. Suitable X and Z axis servodrives 19,20 are provided for moving the slides 16 and 18 for relatively feeding wheel 17. In a preferred setup, wheel 17 would be fed relative to workpiece 12, but this is not critical. A computer numerical control (CNC) 21 is associated with the machine 10, and serves to provide servo commands in accordance with programmed instructions, and in accordance with force parameters detected from a subwheelhead mounting transducer, or load cell 22 (see FIGS. 3 and 4).

The machine bed 13 also supports a wheel conditioning or reshaping unit 23, preferably having a cup-shaped rotary diamond wheel 24, for dressing the superabrasive grind wheel 17. Slides 16 and 18 similarly provide for relative feeding movement between wheel 17 and reshaping tool 24, as desired.

Figure 2:
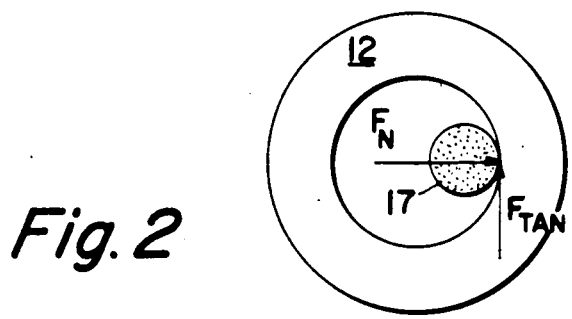
FIG. 2 is a partial elevational view taken through a workpiece as shown in FIG. 1.
Figure 3:
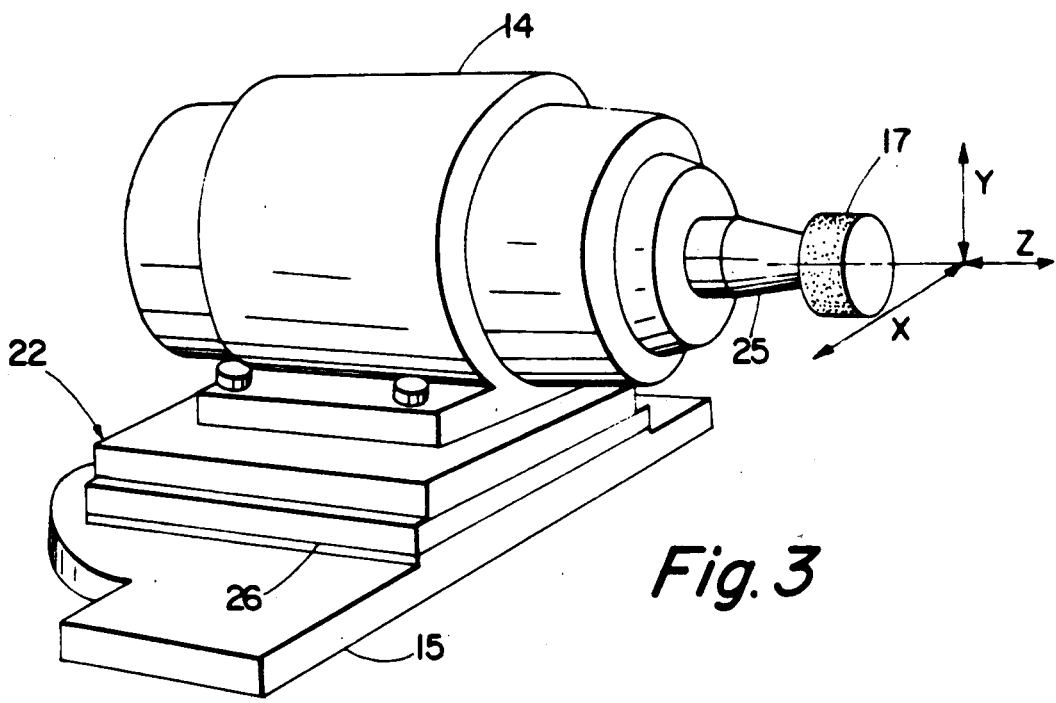
FIG. 3 is an enlarged perspective view of the grinding wheelhead of FIG. 1.
Figure 4:
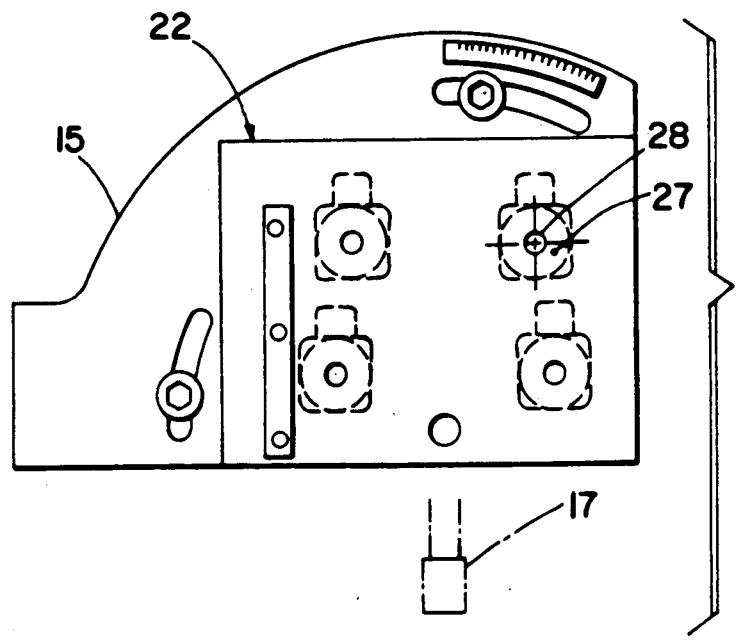
FIG. 4 is an enlarged plan view of a swivel plate and grinding wheelhead mount contemplated for use in an internal grinding machine such as illustrated in FIG. 1.

The elevational view of FIG. 2 shows the grinding wheel 17 in a grinding mode, i.e. within the bore of a workpiece 12, wherein X-axis movement will cause wheel 17 to exert a radial, normal force ($F_n$) on workpiece 12. A tangential force ($F_{tan}$) is also present during grinding. FIG. 3 shows the grinding wheelhead 14 and grinding wheel 17, where wheel 17 is mounted to a rotary spindle 25 in the wheelhead 14, and wheelhead 14 is carried by swivel plate 15, being affixed thereto by an intermediate plate 26 and very stiff load cell 22. As better shown in FIG. 4, load cell 22 preferably comprises an assembly constructed of four piezoelectric devices 27, i.e. solid state members which will yield a signal in response to an applied force. The piezoelectric load cell 22 depicted is a commercial assembly available from Kistler Instrument Corp. of Amherst, N.Y., and is heavily preloaded by means of assembly bolts 28, which establish a preload of several thousand pounds. The load cell 22 utilized is preferably capable of detecting force variations in the X and Z directions (see FIG. 1) and also the Y direction (into the plane of the paper as viewed in FIG. 1), i.e., detecting X, Y, and Z mutually-perpendicular force components. The X component, equivalent to $F_n$ in FIG. 2, is critical for determining system grind conditions, when considering the factor lambda ($\lambda$), which is the volumetric rate of metal removal in cubic length units per time unit per unit normal force.

The standard mounting plate (not shown) commonly used in a wheelhead assembly can be discarded, and the load cell 22 replaces it exactly without significant loss of machine stiffness. FIG. 3a graphically illustrates the substantially identical stiffness achieved by the unique arrangement of load cell 22 relative to the standard mounting plate commonly used in mounting assemblies. The devices 27 are preferably preloaded to 0.1MN which ensures transducer linearity and cell stiffness.

The load cell 22 allows normal, tangential, and axial grinding forces to be accurately and simply obtained. Because cross coupling of signals is typically less than 1% it is not a problem. Therefore, with this system, force measurement fluctuations of less than a fraction of a Newton are discernible, and accuracy and reliability of the system are enhanced accordingly.

The problem of signal drift which is inherent in piezoelectric devices, and which is a function within the time frame measured, is computer adjusted by an appropriate compensation algorithm.

Grinding Wheel Spindle

In prior art machines, force measurements depended on compliant elements that allowed a discernible displacement proportional to the grinding force. As discussed above, spindle deflection was commonly monitored to decipher indirectly the forces being exerted by the grinding wheel. With the machine of the subject invention, a different approach is taken.

The preferred grinding wheel spindle 25 used in the machine of the subject invention is a high frequency spindle built with matched pairs of ABEC Class "9" angular contact ball bearings in both the front and rear. Such an arrangement was selected mostly for its stiffness characteristics, and any similar arrangement can be equally substituted. At lower grinding speeds, a 24 krpm spindle was used, having a 14 kw motor and a static radial stiffness in excess of 90 MN/m. A 45 krpm spindle, with a 9.5 kw motor, was used for higher speeds. The 45 krpm spindle had a static stiffness of 65MN/m. In both cases, the stiffness was measured at the spindle nose. Again, specific choice of machinery is not critical, as long as sufficient stiffness is ensured to allow accurate force measurements.

Figure 5:
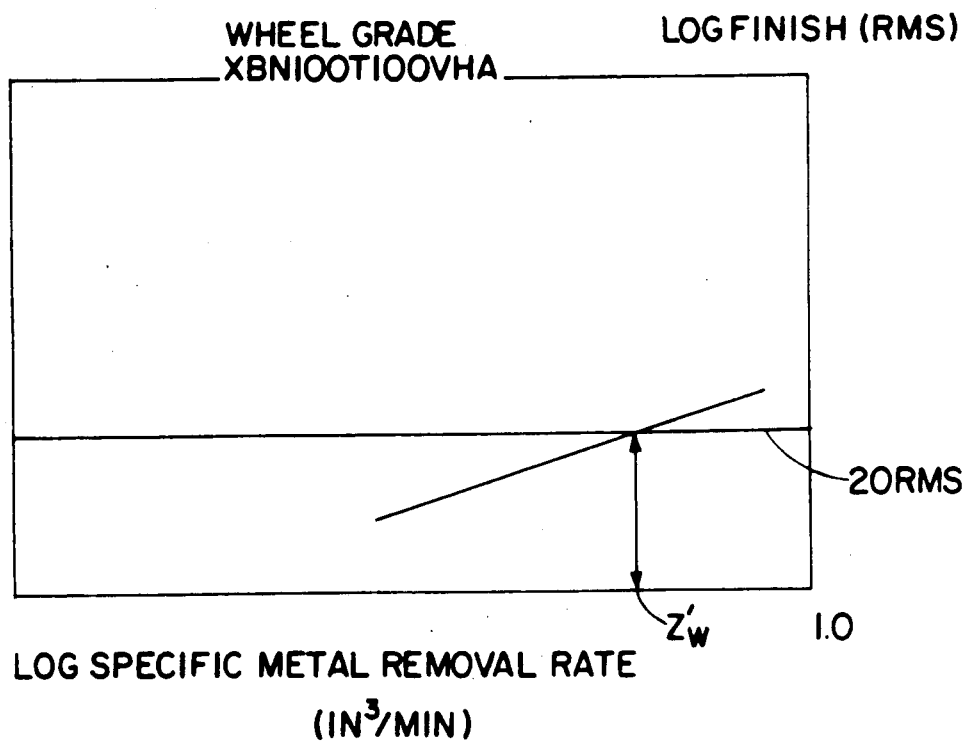
FIG. 5 is a graph showing specific metal removal rate (log) versus finish (log) for a given wheel grade.
Figure 6:
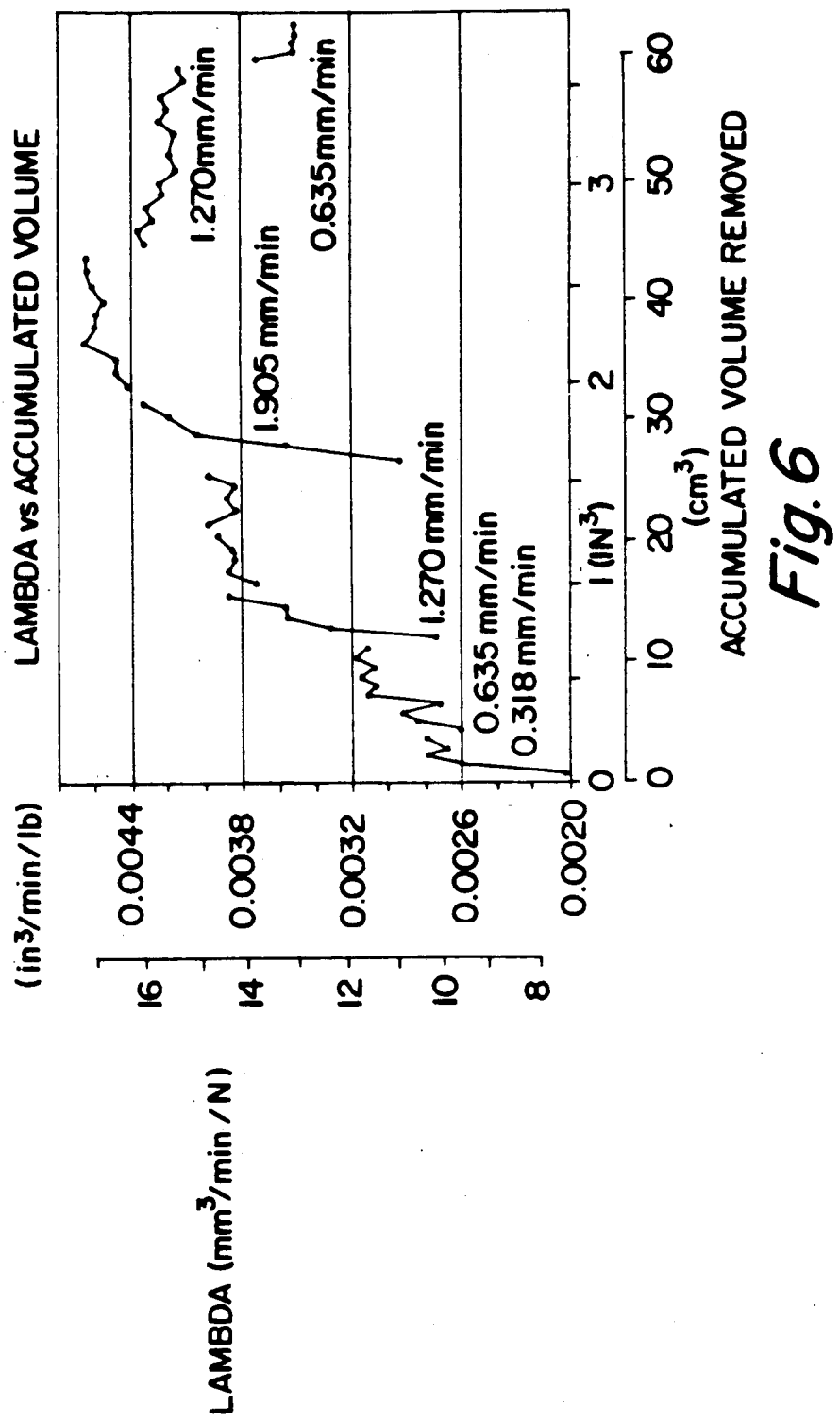
FIG. 6 is a graph showing multiple plots of the metal removal parameter lambda versus accumulated volume of metal removed, for plural infeed velocities during wheel conditioning, for a given wheelgrade.

Referring to FIGS. 5 and 6, certain parameters have been determined for an exemplary superabrasive grinding wheel grade, as indicated. FIG. 5 is a plot of the logorithms of specific metal removal rate versus finish of the workpiece achieved, in RMS (root mean square); while FIG. 6 shows a family of data curves for various feed rates, in which the value of lambda for any particular feed rate tends to level out as steady-state grinding (normal force) conditions are reached. From this and similar data, it has been determined that the values of lambda are important criteria for determining (a) the increase in wheel sharpness as grinding progresses, and (b) the conditioning process for optimizing grinding with an initially "dull" grinding wheel 17 up to and including a preferred lambda or grinding quality range of wheel 17. As indicated, heretofore, a relatively inefficient process of trial and error was required to "condition" a new grinding wheel or a wheel following dressing or trueing in order to gradually increase the output of the machine up to optimum level.

Figure 7:
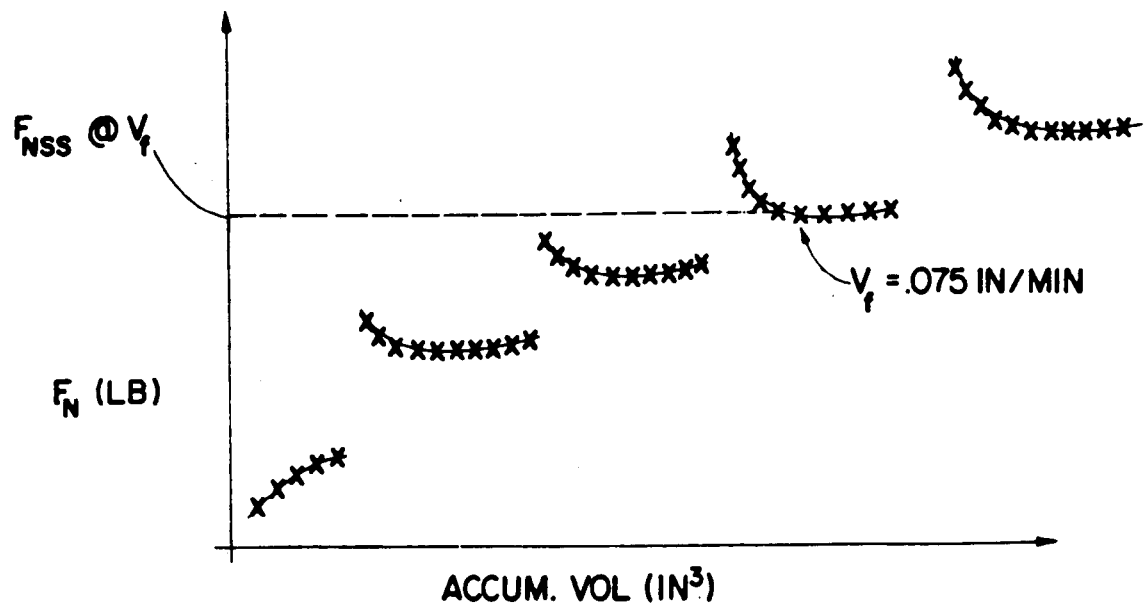
FIG. 7 is a graph plotting normal force versus accumulated volume for plural infeed rates during wheel conditioning.

FIG. 7 shows a plot of normal force versus accumulated volume in grinding cycles, wherein a family of infeed rates are plotted to illustrate the steady-state condition which is eventually reached with a superabrasive wheel 17 for each such infeed rate.

Figure 8:
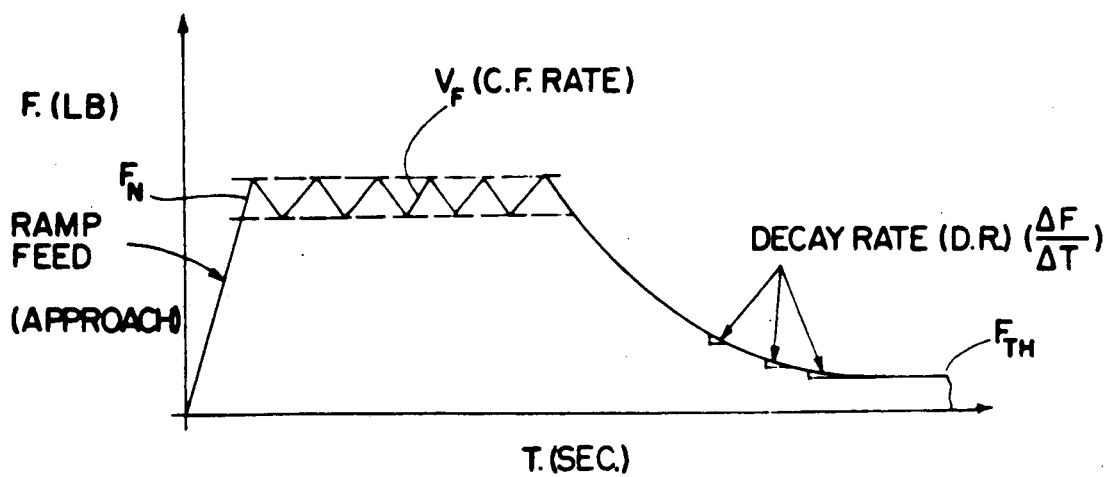
FIG. 8 is a graph of infeed force per unit time, illustrating a controlled force system.

FIG. 8 is a graph illustrating a grinding cycle in terms of force versus time, where the grinding wheel approaches rapidly (i.e. is ramped up) and is held at a controlled force by adjusting the feed rate until infeed is stopped, then a dwell or spark-out period occurs in which the decay rate (D.R.) naturally decreases until a threshold force $F_{th}$ occurs in at the end of decay. The threshold force is defined as an interface force between the grinding wheel and workpiece, at which no grinding occurs.

Figure 9:
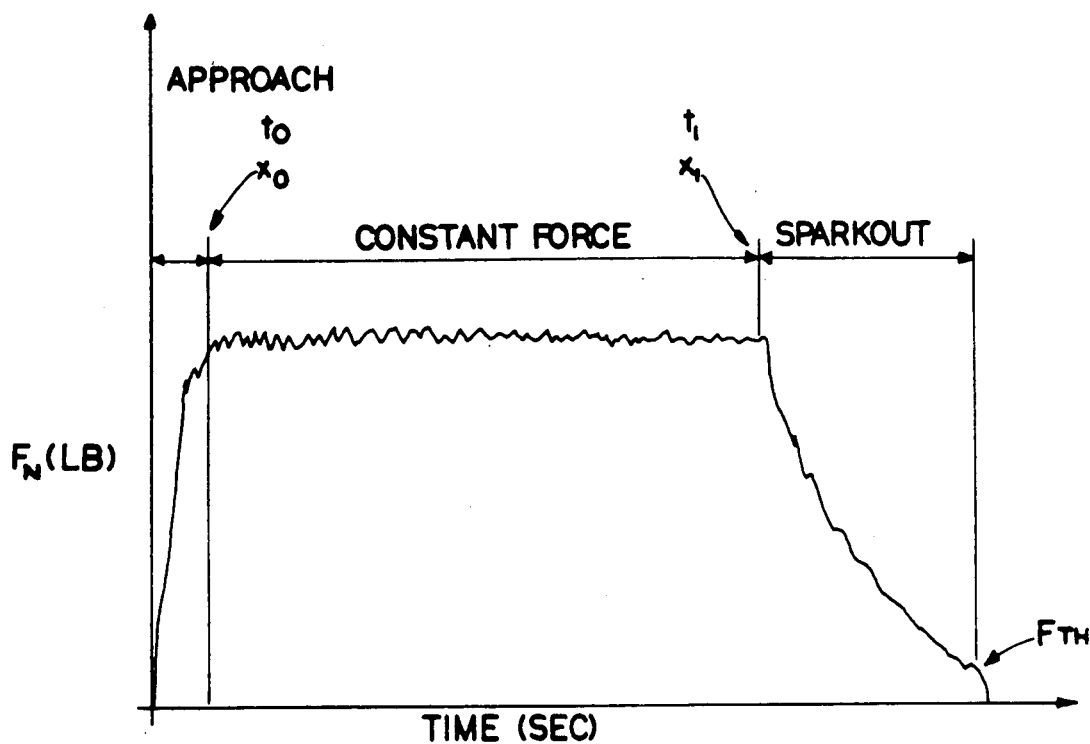
FIG. 9 is a graph plotting normal force versus time as actually taken during a constant grind force cycle.

FIG. 9 is a graph showing an actual plot of normal grinding force $F_n$ versus time. This figure illustrates the substantially instant ramp-up characteristics of the subject invention and the substantially constant force at which grinding is completed. It should be noted that it is imperative that grinding be undertaken at a substantially constant force (e.g. versus at a predetermined feed rate) to achieve a steady state deflection situation, as will be further described below.

Figure 10:
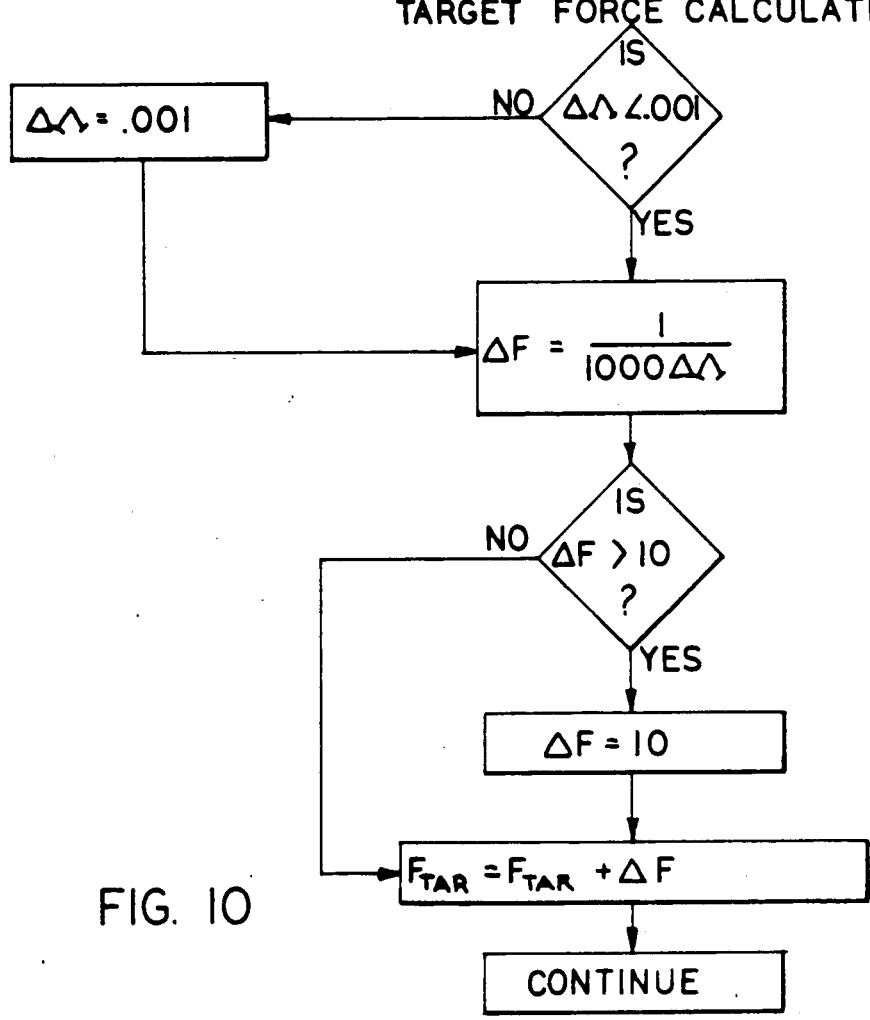
FIG. 10 is a flow chart illustrating how the target normal force ($F_{tar}$) is automatically calculated by the subject system.

FIG. 10 demonstrates a flow chart of how the target force $F_{tar}$) is automatically calculated. Based upon the monitored change in $\lambda$ from one part to the next, the target force ($F_{tar}$) is calculated for the next grind.

As illustrated, a preferred process for determining changes in the normal force between the grinding wheel and the workpiece during the conditioning of the wheel is based on an inverse proportion compared to changes in sharpness monitored. Where large changes in sharpness are occuring, smaller changes in force are necessary to conditioning, and vice-versa. The conditioning force change limit of 10 pounds has been illustrated only as an example, as other preprogrammed values could equally be employed.

In addition to the standard criteria describing the composition of a vitreous bonded CBN (or other superabrasive) grinding wheel (i.e., grit size, concentration, bond volume, and porosity) a major factor in a determination of the wheel's metal removal characteristic is the condition of the wheel surface.

Immediately after trueing there is little, if any, grain protrusion because the bond surface is flush with the grain tips. This causes a dull acting wheel with a low metal removal capacity, because there is little exposed grit and no room for removed metal to escape from between the grinding interface. A dull wheel can be opened, or conditioned, by several methods including grit blasting, sticking with a soft Carborundum stick, or grinding, usually at reduced rates. The purpose of each of these methods is to erode the bond to create sufficient grit protrusion and chip clearance. None of these methods, however, is efficient or reliably controllable (i.e. consistently repeatable).

When running in a production situation, after a number of grinding cycles, the vitrified CBN wheel will eventually condition itself. This self-sharpening will generally continue until a steady-state or intrinsic wheel sharpness is reached. This intrinsic state would be the desired grinding condition. This condition is difficult to achieve in any repeatable or predictable manner by grit blasting or sticking. Therefore, heretofore, it has been common to approach this state by a controlled process which usually involves reducing the feed rate after a dress-off of a new wheel or reshaping of a used wheel, and gradually increasing this rate as the wheel gets sharper. This process was generally trial and error in nature, and was directed to avoiding burn of the workpiece and/or damage to the grinding wheel. Some prior art machines are capable of automatically performing this conditioning cycle from discrete fixed input, however, the present invention provides a system to do this automatically from feedback of the wheel sharpness value, $\lambda_w$, described below. While wheel sharpness is technically $\lambda_w$ divided by wheel speed ($V_s$), because wheel speed will vary only minimally between grinds, for the purposes of this discussion, $\lambda_w$ will be understood as equivalent to and used interchangeably with wheel sharpness. It should also be noted that the term lambda may be equally designated herein by the symbols $\Lambda$, $\lambda$ or WRP (work removal parameter).

Also, due to low wear rates, a vitrified bonded CBN wheel commonly skips some number of parts before requiring a re-trueing operation. When trueing is completed, however, it is difficult to predict how the trueing action will affect the wheel's sharpness or cutting capability. The process described below is a method to perform a hands-off, operator-free, automatic wheel conditioning cycle to accommodate the dulling effects of trueing, either after new wheel dress-off or after a skip dress.

Figure 6A:
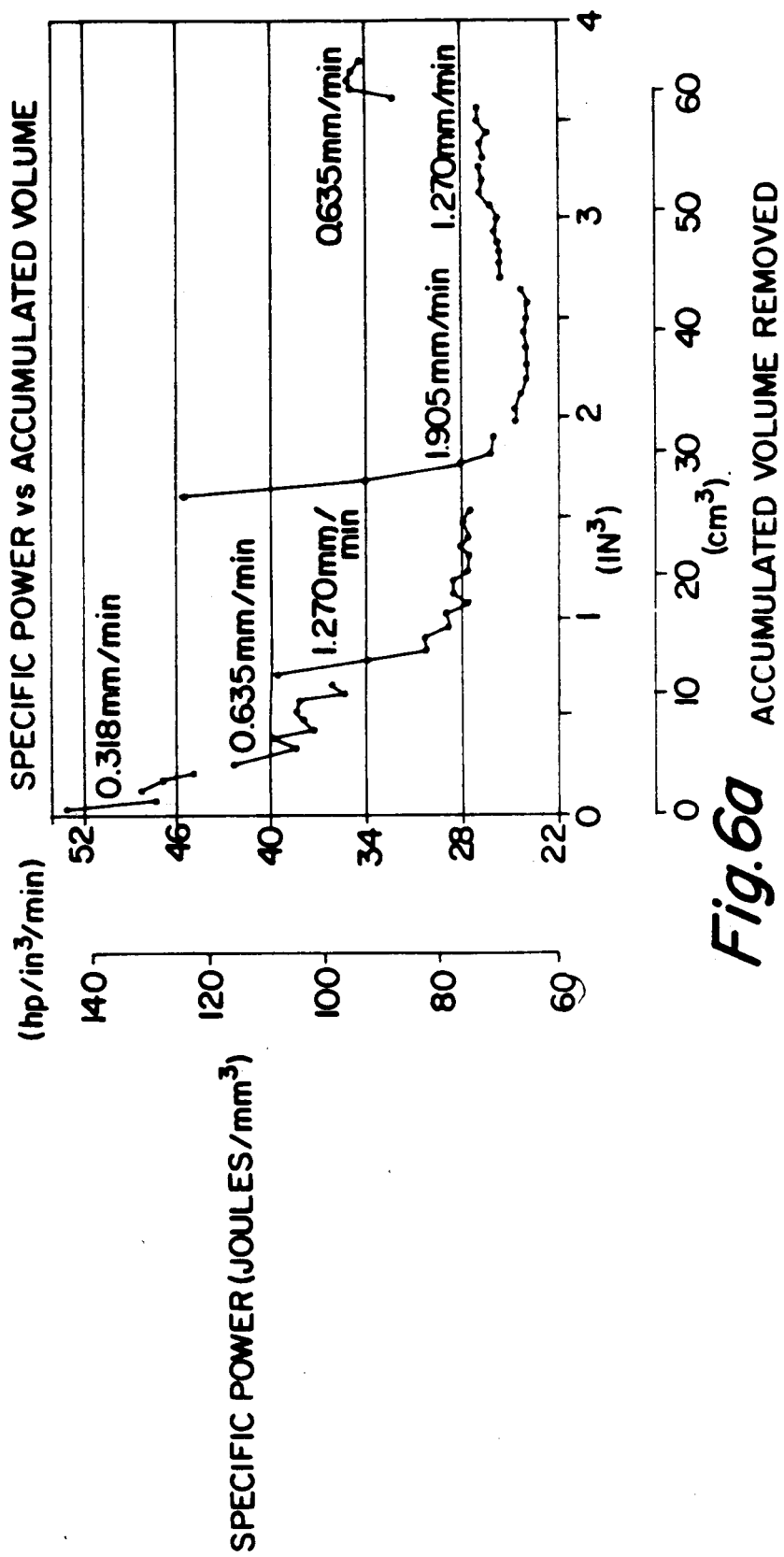
FIG. 6a is a plot of specific wheel power consumed versus accumulated volume of metal removed from a workpiece.

With successive parts ground, the wheel 17 acts sharper as the bond is eroded. As a result, the force level diminishes for a given feed rate until an intrinsic sharpness value is reached. If force is held substantially constant, the sharper wheel removes a greater volume of metal per unit time. Two measurements of sharpness were calculated. One measure, the metal removal parameter, $\lambda_w$, is expressed as the volumetric rate of metal removal per unit force, mm$^3$/min/N (see FIG. 6). Another is specific power expressed as joules/mm$^3$ (see FIG. 6a). Both FIGS. 6 and 6a illustrate the effect of feed rate on the steady state wheel sharpness (i.e., a steady state wheel sharpness value is approached for each particular feed rate as the wheel conditions).

Figure 3B:
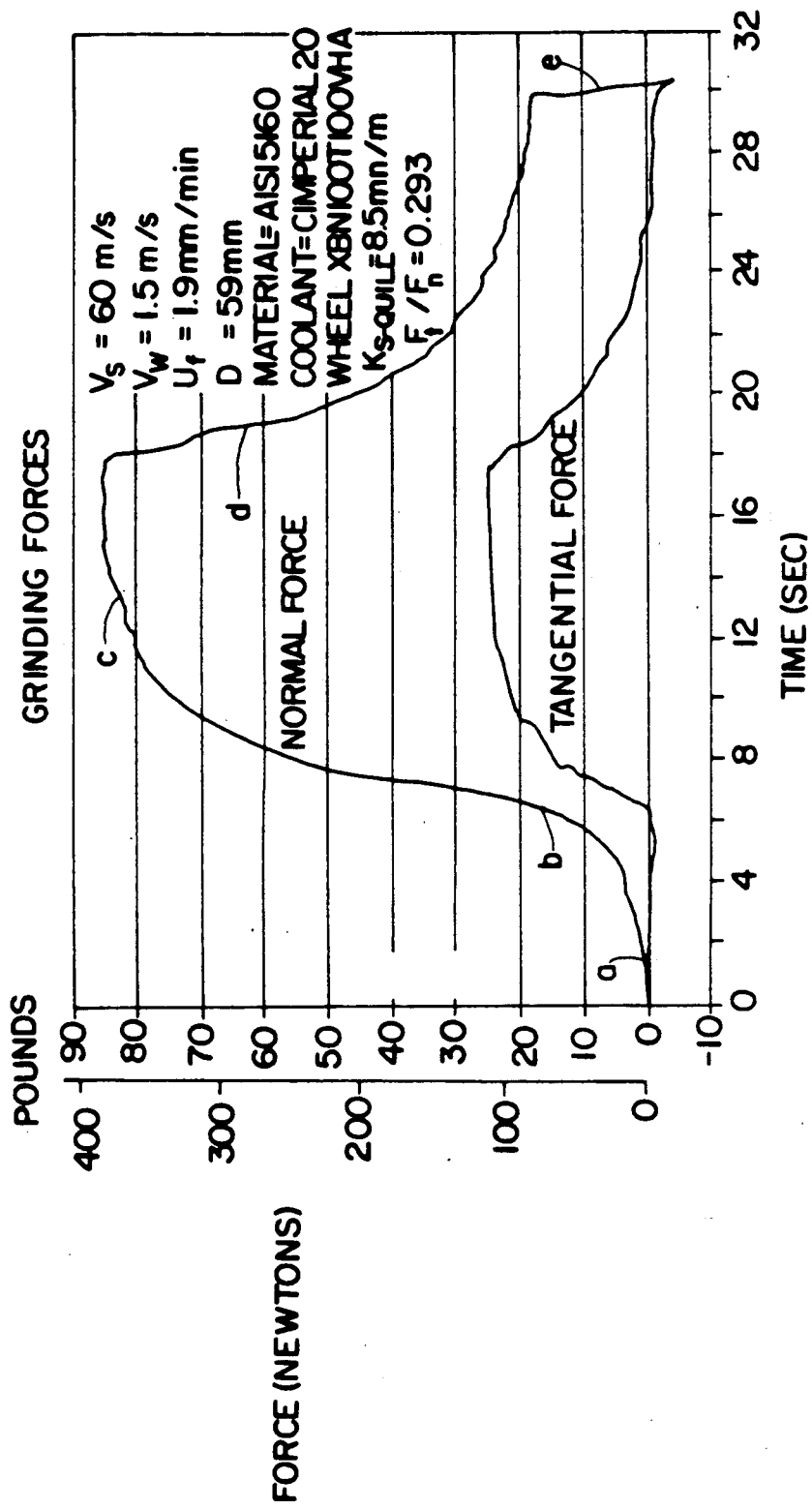
FIG. 3b is a plot of grinding forces determined during a grinding test with a superabrasive (CBN) wheel.

The principle employed herein for adaptive grinding with bonded CBN abrasives is centered around the ability to measure the wheel condition continuously via monitoring of the grinding forces, coupled with the fact that, in a stiff machine setup, the value of lambda may be calculated (periodically or continuously) by using wheel/workpiece displacement per unit time, diameter of workpiece 12, and the width of the cut taken by the wheel 17. Typical output traces from the force measurement system are shown in FIG. 3b. The traces are characteristic and have five distinct phases as indicated on the normal force tracing: (a) approach (non-contact), (b) elastic take-up and force rise (ramp-up), (c) grinding at steady state, (d) spark-out, and (e) the threshold force level above the non-contact state. The accurate and reliable calculation of wheel sharpness values is a primary achievement of the normal force monitoring of the subject invention; however, the specific energy, the energy at burn, and optimized spark-out times can also be determined by this same monitoring structure.

Further, with this system, dressing forces can be measured sensitively (e.g., see FIG. 10a), allowing the topographical condition of the wheel face to be assessed. Thus the control can alert a wheel condition that exhibits non-uniform hardness, structure, or shape, and eliminate scrap parts due to improper bore profile or taper. In particular, it is contemplated that the normal force monitored during contact between a reshaping tool (e.g. 24 of FIG. 1) and a superabrasive wheel (e.g. 17) taken at various points (laterally across the face) of the wheel can be used to "map" the surface of the wheel. Similarly, following a determination of the topography of a wheel, appropriate commands could be implemented to reshape such wheel so as to minimize reshaping in areas of the wheel where reshaping is not needed. This process would limit the reshaping required, thereby speeding up the process, making the dress or trueing operation more accurate, and minimizing unnecessary reduction of wheel diameter. Proper dressing procedures (i.e. light cuts) can also help minimize the need for trueing the grinding wheel (i.e. heavier cuts), which may also extend the useful life of a grinding wheel.

Referring to FIG. 3b, it may be noted that steady state maximum force levels and steady state decay threshold levels are approached. Based on the use of vitrified bonded CBN wheels, assumptions for negligible wheel wear and negligible sharpness changes within each cycle were made during tests. Therefore, in the steady state portion of the grind cycle, the spindle deflection rate is zero and the metal removal rate can be given by $$Q_w = \pi [D_w W] [v_f]$$
$Q_w$ = metal removal rate
$D_w$ = workpiece diameter
$W$ = contact width
$v_f$ = radial feed rate Also, if the threshold force level is ascertained empirically for various wheel sharpness conditions, then the grinding force decay rate at any point on the spark-out curve can be determined from $$\frac{\partial F_n}{\partial t} = \left[\frac{(F_i - F_{th}) \lambda_W K_s}{60\pi D_w W}\right] \exp\left[\frac{-t_c \lambda_W K_s}{60\pi D_w W}\right]$$

$\lambda_W$ = metal removal parameter
$F_i$ = initial normal spark-out force
$F_{th}$ = threshold normal force
$K_s$ = system stiffness
$t_c$ = time By observing this force trend, the condition of the wheel 17 is determinable. Hence, the decision to dress can be made based on grinding forces measured during the decay cycle.

Also, as the wheel shape deteriorates, the need to true becomes vital. FIG. 10b shows how the equivalent diameter of the wheel, De, and the dress frequency are related. This can be expressed simply as:

$$PPD = A D_e^B$$

where PPD = parts per dress

A,B = wheel related constants

Figure 10A:
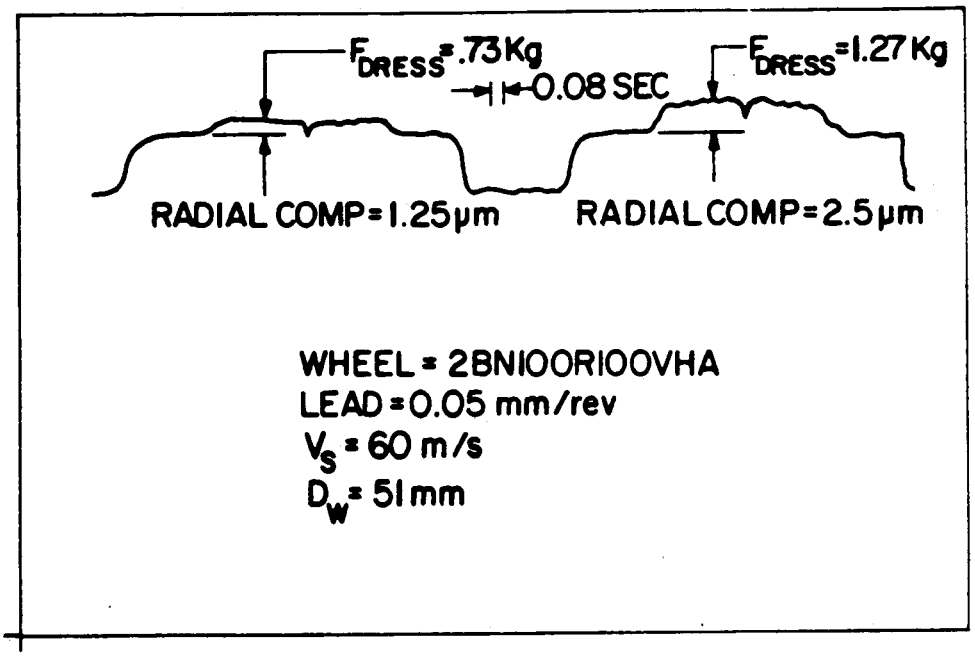
FIG. 10a is a plot of normal force measurements measured during two wheel dressing procedures, with such force measurements taken across two grinding wheels clamped together, side by side in both cases; illustrating the sensitivity of the force monitoring capabilities of a system made in accordance herewith.
Figure 10B:
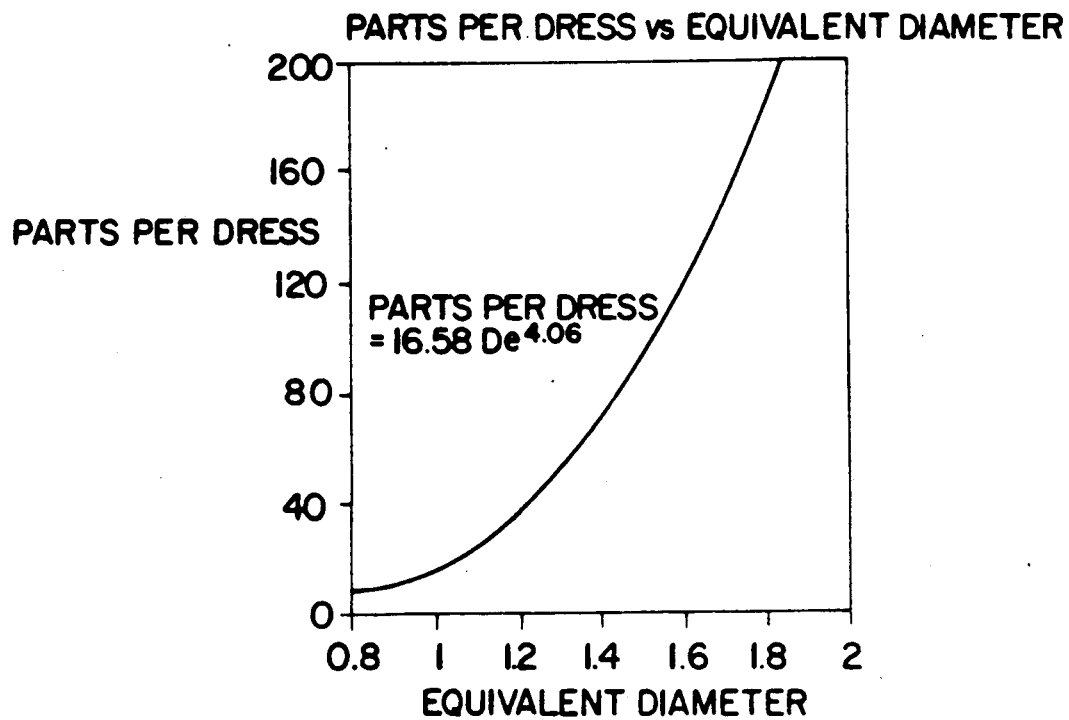
FIG. 10b is a graph plotting parts per dress versus the equivalent diameter of the grinding wheel.

FIG. 10a shows a plot of normal force measurements taken across two grinding wheels clamped together, side-by-side, and illustrating differing force levels resulting from different radial comp values.

Determining Wheel Sharpness

Using the piezoelectric load cell 22, the machine control is able to measure both the normal grinding force, $F_n$, and tangential grinding force, $F_t$. From the $F_n$ measurement the control can achieve a constant force grind cycle, as illustrated in the graph of FIG. 9. Because the normal force is held constant, a steady-state deflection situation is achieved such that $$v_f = v_s + v_w \text{ where, } v_f = \text{``X'' axis feed rate}$$
$v_s$ = rate of wheel radius change
$v_w$ = rate of work radius change In addition, because of the negligible wear rate of a vitrified bonded CBN wheel, vs can be assumed to be 0, leaving $$v_f = v_w$$

Referring to FIG. 9, the machine control monitors a time interval during the constant force portion of the cycle, $t_0$ to $t_1$, and also monitors the amount of X-axis feed during this interval, $X_0$ to $X_1$. It then calculates $$v_f = \frac{x_1 - x_0}{t_1 - t_0} = \frac{\Delta x}{\Delta t}$$

The metal removal parameter lambda, or $\lambda_w$, is described by the following formula $$\lambda_w = \frac{\pi D W v_f}{F_n - F_{th}}$$

Where,
$D$ = workdiameter
$W$ = workwidth
$\pi$ = constant
$F_{th}$ = threshold force The control will then easily calculate a value for lambda, since $\pi$, D, and W are constants, $F_{th}$ and $F_n$ are measured, and $v_f$ was just calculated. Because $\lambda_w$ is a description of the wheel sharpness, or metal removal capability, the machine control can now consult a stored expression or algorithm, derived either empirically or analytically, to determine an allowable grind force, $F_n$, for the next part to be ground corresponding to the calculated $\lambda_w$ value. From this new $F_n$ value, the corresponding $v_f$ value can be calculated, since $$v_f = \frac{\lambda_w (F_n - F_{th})}{\pi D W} \text{ to maintain this new } F_n \text{ value.}$$

The value of $\lambda_w$ can be so calculated to maintain this new $F_n$ value as often as desired, and is contemplated as being calculated for each revolution of the workpiece.

Wheel Conditioning

After every new wheel dress, skip dress, or dress on demand, the machine control 21 will automatically begin grinding the next workpiece 12 at a predetermined (or default) test grind normal force, $F_{n\text{-}test}$. During this test grind a value for $\lambda_w$ will be determined as described above. This value will then determine the maximum allowable constant $F_n$ value, and also the corresponding $v_f$ value, for the next workpiece. This procedure will continue until the $F_n$ has reached a desired value, usually the value associated with the intrinsic $\lambda_w$ value of the grinding wheel 17. In this way, the system automatically optimizes the grinding process and conditioning of the wheel.

While the terms "trueing" and "dressing" are often used interchangeably in the prior art, separate definitions are used herein to attain a properly-conditioned wheel. Specifically, dressing of the wheel is done primarily to establish the finish and ability to remove metal (i e. surface integrity of the wheel), and therefore, "dressing conditions" set in the machine cycle involve light cuts (and compensation therefor) at slow (relative) feed rates of the conditioning tool—for example, diamond nib or wheel—relative to the wheel. In contrast, trueing of the wheel is done primarily to establish the shape of the wheel—either where new or after use—and therefore, "trueing conditions" set in the machine cycle generally involve heavier cuts (and compensation therefor) at fast (relative) feed rates of the conditioning tool and wheel.

Therefore, a preferred single force grinding method is readily achieved as follows:

Grinding Method—Single Force System

Step 1

With reference to FIGS. 5 and 6; on the assumption that trueing makes a dull wheel, perform a sharpness test on a given wheel type or grade—for example, an XBN 100T 100VHA—to determine:
 a. $\lambda$ of a dull wheel, i.e., $\lambda$ exp (lambda expected)
 b. $F_{th}$ of a true wheel, i.e., $F_{th}$ max
 c. $F_{nss}$ (normal force at steady state) at $Z_w$ that produces the required RMS finish, i.e., $F_n$.
 d.

$$\lambda_{ss} = \frac{Z_w}{F_{nss}}$$

Step 2

Select:
 a. Approach factor for Ramp Feed Rate, i.e., $N_1$
 b. Decay Rate $$\frac{\Delta F}{\Delta t},$$

value to describe $F_{th}$, i.e., D.R.
 c. C.F. (Controlled Force) Rate Factor to maintain grind force, i.e., $N_2$
 d. $\lambda$ upper and lower limits for skip dress, i.e., $\lambda_u$, $\lambda_L$ ($\lambda_L$ could be lower than $\lambda_{min}$.)

Step 3

Determine grind parameters following multiple pass dress:
 a. C.F. Rate =

$$\frac{\lambda \min(F_n - F_{th})}{\pi DW},$$

i.e. $V_f \times N_2$
 b. Ramp Rate = $N_1 \times V_f$, i.e. $V_{AD}$

Step 4

Monitor actual wheel sharpness parameters during grind to determine rates for next cycle:
 a. measure $$\frac{\Delta X}{\Delta t}$$

during constant force portion of cycle cycle
 b. measure $F_{th}$ at predetermined decay rate value and adjust finish grind position accordingly
 c. calculate actual $\lambda$, where $\lambda$ act =

$$\pi DW \frac{\left(\frac{\Delta X}{\Delta t}\right)}{F_n - F_{th}}$$

d. compare $\lambda$ act to $\lambda_U$ and $\lambda_L$ to determine if skip dress is required.

Step 5

Determine grind parameters for subsequent revolutions of the workpiece
 a C.F. feed rate =

$$\frac{\Delta X}{\Delta t} \times N_2,$$

i.e., $V_f$
 b. Ramp Rate = $V_f \times N_1$, i.e. $V_{AD}$
 c. Spark-out time determined by D.R. setting

Step 6

Continue steps 4 and 5 within the present grind cycle and subsequent grind cycles until a multiple pass dress is performed.

The method and apparatus disclosed herein are the outgrowth of a grinding test setup designed to evaluate superabrasive wheels—in particular CBN wheels.

CBN GRINDING TEST SETUP AND DATA ACQUISITION TECHNIQUE

Computerized data acquisition is an extremely powerful modern engineering tool. Analog or digital parameters can be electronically interfaced with personal computers for analysis. The desired triggering and timing can be easily programmed, and formulas can be applied to the inputs before they are stored. Once the data are collected, other variables can be generated as a function of the measured items. Valuable graphs can also be generated to show descriptively the relationships between the parameters. Because of the high resolution of the data, these graphs can be expanded to examine closely a particular area in greater detail. It is also contemplated that computer artificial intelligence could advantageously be adapted to further enhance this invention. For example, the computer could determine initial feed rates, critical normal force and lambda values, and, possibly, determine skip dress cycles based upon its "learnings" over a plurality of grinding cycles and "experience" with particular types and grades of grinding wheels The following procedure describes how a data acquisition system has been applied to test the internal grinding machine of the present invention. This data acquisition process is used to evaluate wheels, grinding fluids, dressers, and most importantly, provide the basis for the adaptive control philosophy.

Test Data Acquisition Equipment

Figure 14:
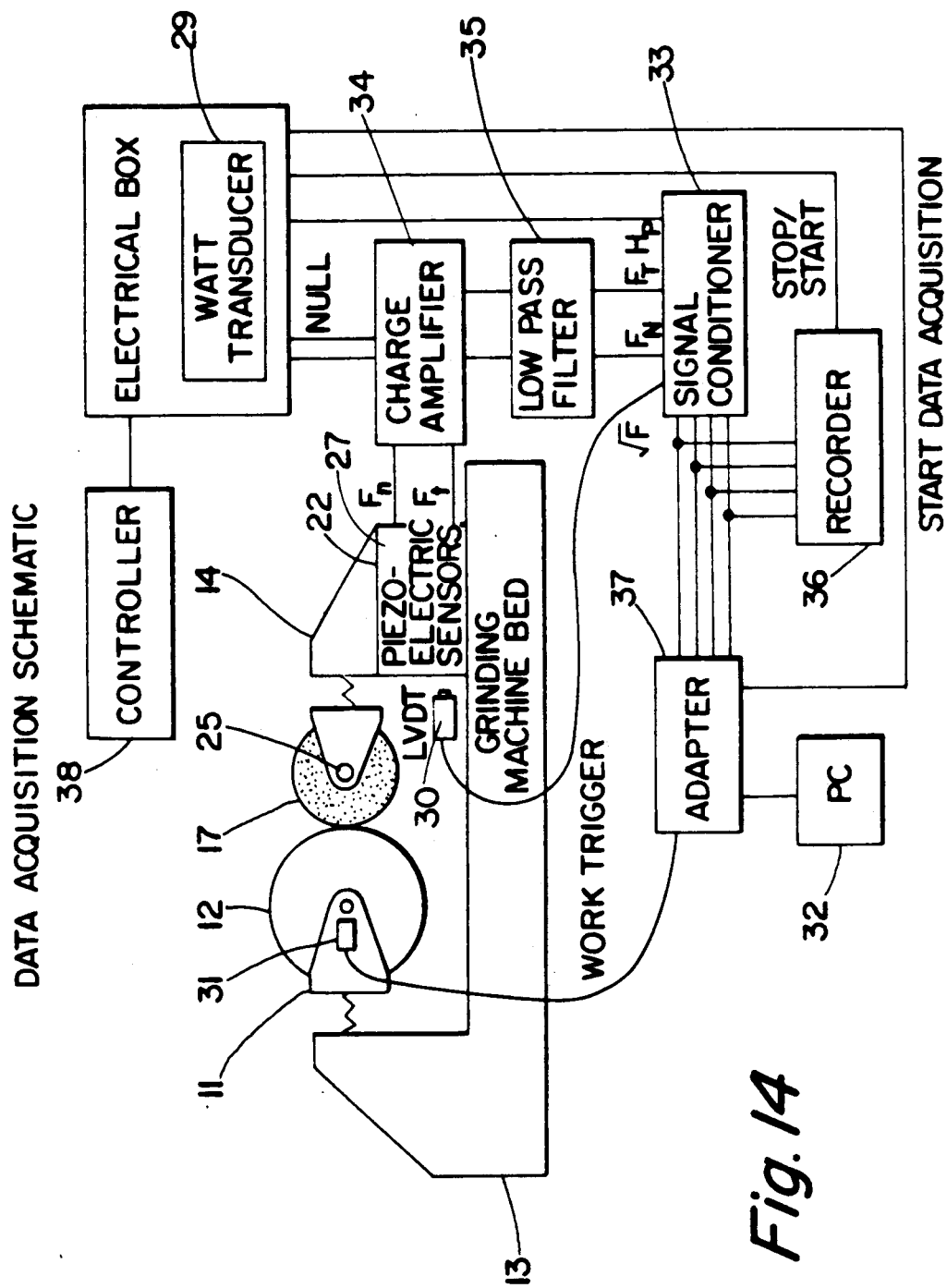
FIG. 14 is a schematic diagram of an alternate CBN grinding test setup in accordance with the present invention.
Figure 15:
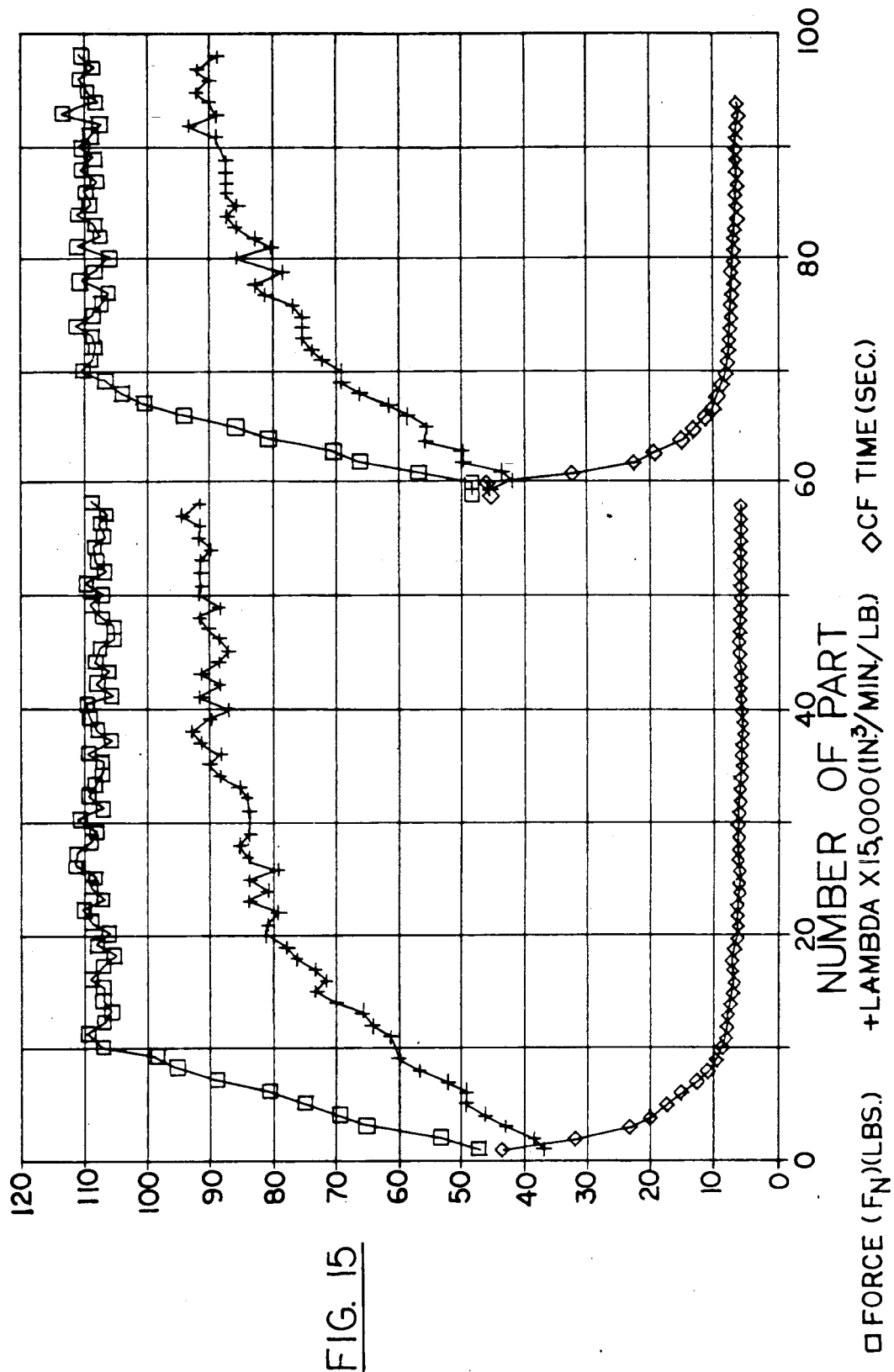
FIG. 15 is a normalized plot of normal force, lambda ($\times 15,000$), and time for a plurality of parts ground with a superabrasive wheel, illustrating the conditioning process of the wheel following dressing operations prior to parts 1 and 59.

With reference to FIG. 14, a schematic diagram, the principal elements of the test data acquisition system are,
 a) a set of piezoelectric force rings (load cell 22), mounted under the grinding wheelhead 14 and spindle 25 for measuring grinding forces,
 b) a power monitor (watt transducer 29) for determining wheelhead power consumption, and for cross-referencing targential forces experienced by the grinding wheel $F_t$,
 c) a linear variable differential transformer (LVDT) 30 or similar linear feedback device for monitoring the X-axis position of the grinding wheel,
 d) a proximity switch 31 mounted at the rear of the workhead 11 for triggering the data collection activity,
 e) a 32 bit microcomputer, PC32, with hard disk and floppy disk drives for collecting and storing the data, and
 f) signal conditioner boards 33, amplifiers 34 and filters 35.

Signal Processing

Four parameters were measured
1) LVDT—X slide position
2) HP—wheelhead power
3) $F_{tan}$ or $F_t$—tangential grinding force
4) $F_n$—normal grinding force The normal and tangential forces are measured during each revolution of workpiece 12 by the piezoelectric devices 27 of the load cell 22. The piezoelectric circuitry (not shown) has provisions to null when commanded, and it is preferred that the devices 27 be nulled prior to each grinding cycle.

The two measured force signals are then sent to a low pass filter 35 to eliminate variations due to wheelhead rotational speed. Both of these signals, along with the horsepower signal from the power monitor 29 and the displacement signal from the LVDT 30, are fed into the signal conditioner 33. Signal conditioner 33 minimizes the noise generated by the servo drives 19 and 20 and also adds a calibration point. The four signals are fed to both the personal computer, PC32, and a strip chart recorder 36.

The interface to the PC32 is via the data acquisition board and adapter 37. Two additional inputs into the PC32 are a start acquisition signal and the workhead proximity switch 31. The strip chart recorder 36 was used during the test merely for comparison. The recorder 36 has start and stop inputs available.

Procedure to Acquire Data

Initially, data were collected every 0.025 seconds (i.e. five times per revolution of workpiece 12 being rotated at 480 rpm). This resulted in too much data being collected. The solution to this problem was to install the a workhead proximity switch or trigger 31 as a trigger sensor to assure synchronization of acquisition with work speed. It was not important whether the maximum force, minimum force or some interim force of each revolution was being recorded, because all grind cycles were purposely set up so that steady state forces were achieved and the part was properly rounded up.

Just before the (CNC) machine controller 38 started the feed rate grind, a command was sent from the controller 38 to start the strip chart recorder 36. Half a second later the command was given to null the piezoelectric circuit associated with the load cell 22. This eliminated previous signal drift.

Simultaneously, the data acquisition software was commanded to start the data collection. When the signal was received, it collected data each time the workhead trigger was sensed (preferably each revolution of workpiece 12). One set of four values was then stored in memory. These inputs were analog values. Negative ten volts to positive ten volts were represented by a value of 0 to 4095. Each time the proximity switch 31 was sensed, another set of data was stored. This continued until the controller 38 removed the start acquisition command after completing the grind. Since the work speed was 480 RPM, data collection occurred eight times per second.

Once the grind cycle was completed, the acquisition software converted the raw data to actual values of mm, watts and newtons. The conversions had been previously specified by a programmable formula for each input. Then the values were automatically put into a spreadsheet at previously defined cell locations. At this point, the acquisition software had completed its task.

Now the spreadsheet took over using its macro capabilities. Normal force, tangential force, and the threshold force were sequentially displayed on the computer, PC32, as graphs to assure the integrity of the data. FIG. 3b shows a sample of $F_n$ and $F_t$ data collected for one grinding cycle. Based on all the data in the spreadsheet, many calculations were performed to determine normal force, lambda and time relationships, as set forth above. Maximum values of the steady state $F_n$, $F_t$ and Power (HP) were determined and used for the calculations.

A report file of each grind was imported into a summary spreadsheet. Table 1 contains sample data that were saved on the hard disk in a report file from which summary data sheets were generated.

TABLE 1

Report Summary for test Wheel I5 at 1.905 $\frac{mm}{min}$ (.075 IPM)

| grind no | spec pwr joules/mm$^3$ | $F_n$ max N | $F_t$ max N | F th N | lambda mm$^3$/min/N | finish Ra | acc vol cm$^3$ |
|---|---|---|---|---|---|---|---|
| I5r1 | 123.5 | 773 | 286 | 98 | 10.8 | .31 | 26.60 |
| I5r2 | 98.3 | 645 | 233 | 89 | 13.1 | .33 | 27.81 |
| I5r3 | 77.0 | 573 | 199 | 85 | 14.9 | .33 | 29.02 |
| I5r4 | 71.5 | 556 | 188 | 85 | 15.4 | .33 | 30.25 |
| I5r5 | 71.0 | 536 | 182 | 80 | 16.9 | .34 | 31.46 |
| I5r6 | 67.5 | 527 | 176 | 80 | 16.3 | .34 | 32.68 |
| I5r7 | 67.5 | 522 | 175 | 80 | 16.5 | .34 | 33.89 |
| I5r8 | 66.4 | 523 | 173 | 80 | 16.5 | .34 | 35.10 |
| I5r9 | 65.4 | 506 | 174 | 80 | 17.1 | .35 | 36.31 |
| I5r10 | 65.4 | 511 | 171 |  | 16.9 | .35 | 37.53 |
| I5r11 | 65.4 | 512 | 171 | 80 | 16.9 | .34 | 38.74 |
| I5r12 | 66.0 | 516 | 171 | 80 | 16.8 | .35 | 39.97 |
| I5r13 | 65.7 | 510 | 170 | 80 | 16.9 | .35 | 41.18 |
| I5r14 | 65.6 | 507 | 171 | 80 | 17.1 | .36 | 42.39 |
| I5r15 | 66.1 | 506 | 171 | 80 | 17.1 | .36 | 43.61 |

The normal force may also be used to trigger the end of a gap eliminator rate, i.e., where a wheelslide is advanced to the workpiece at a maximum rate, to avoid "cutting air" at a grinding feed rate. When the wheel contacts the workpiece, the gap rate is dropped out and the machine goes into a coarse grinding rate.

Figure 11:
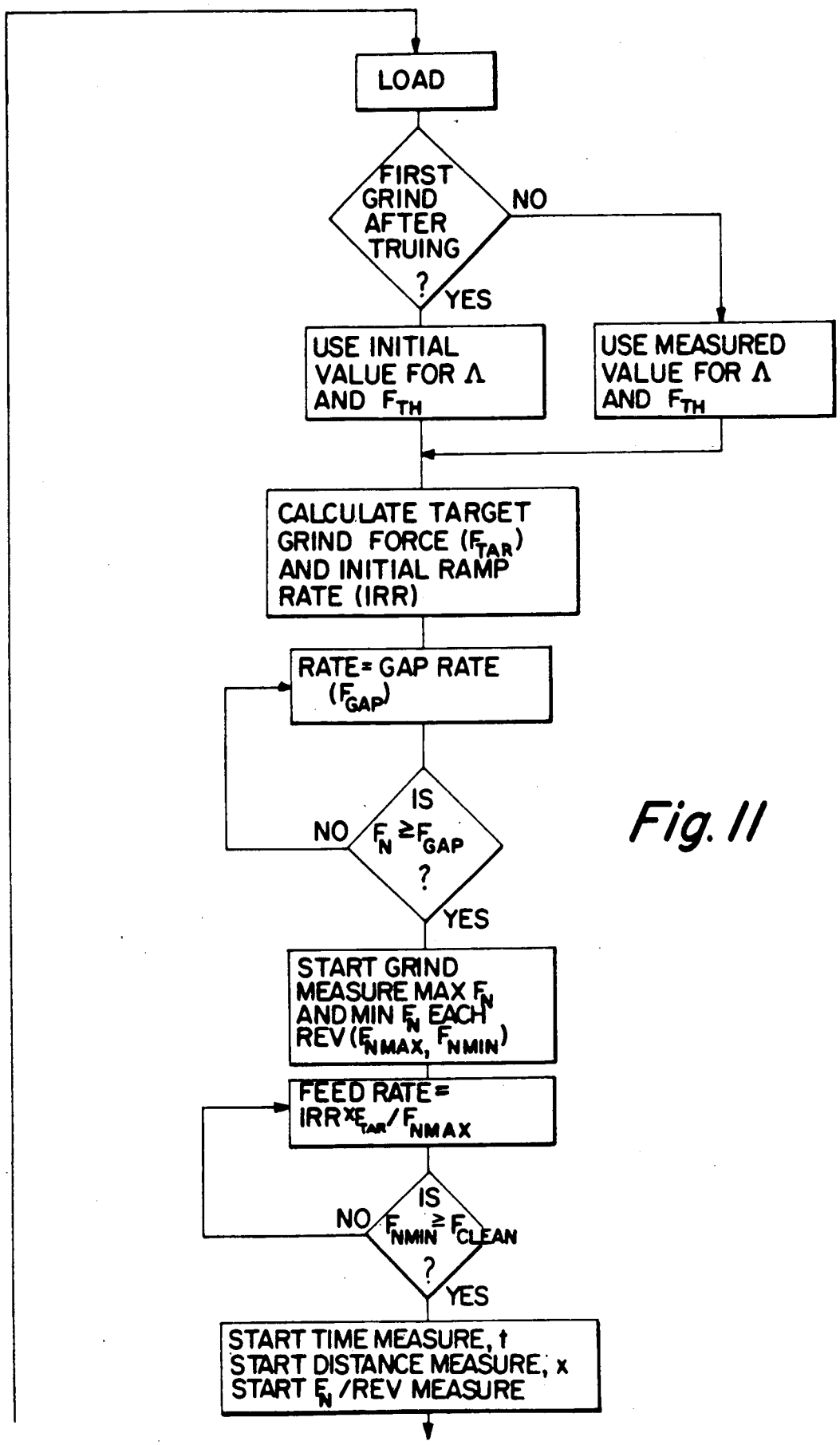
FIG. 11 is the top portion of a flow chart for a preferred grinding system.
Figure 12:
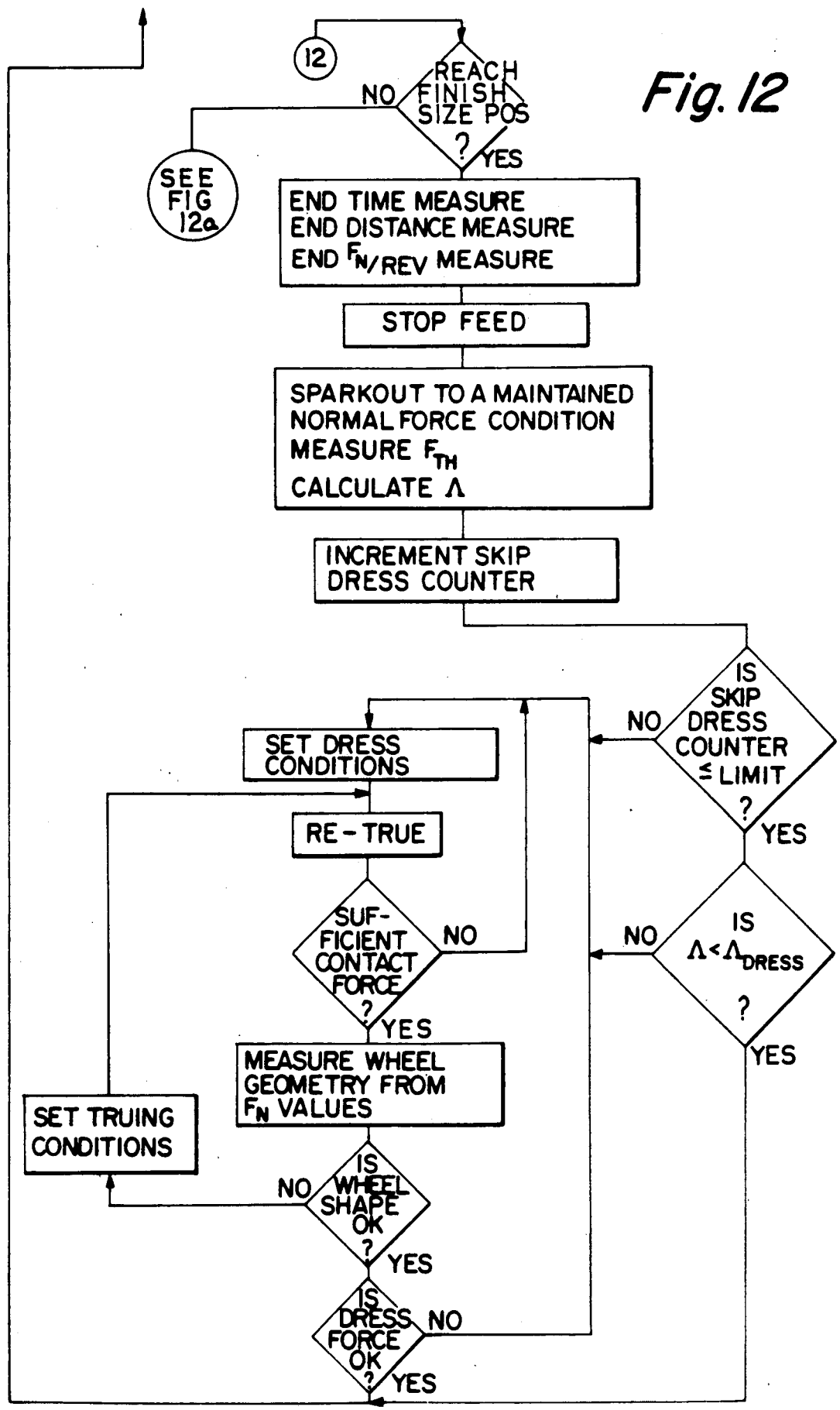
FIG. 12 is the bottom portion of the flow chart of FIG. 11.
Figure 12A:
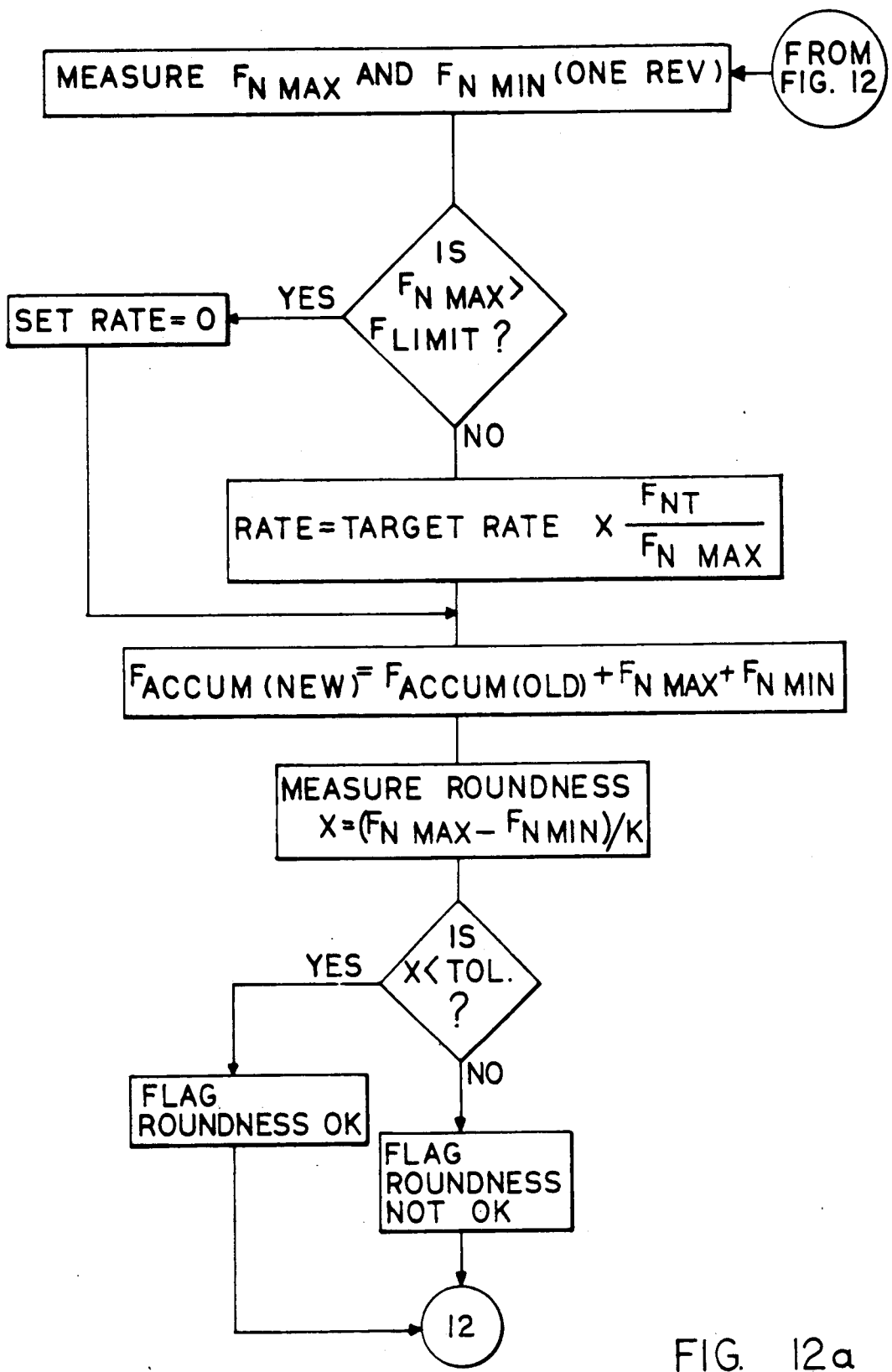
FIG. 12a is an additional portion of the flow chart of FIG. 12.
Figure 13:
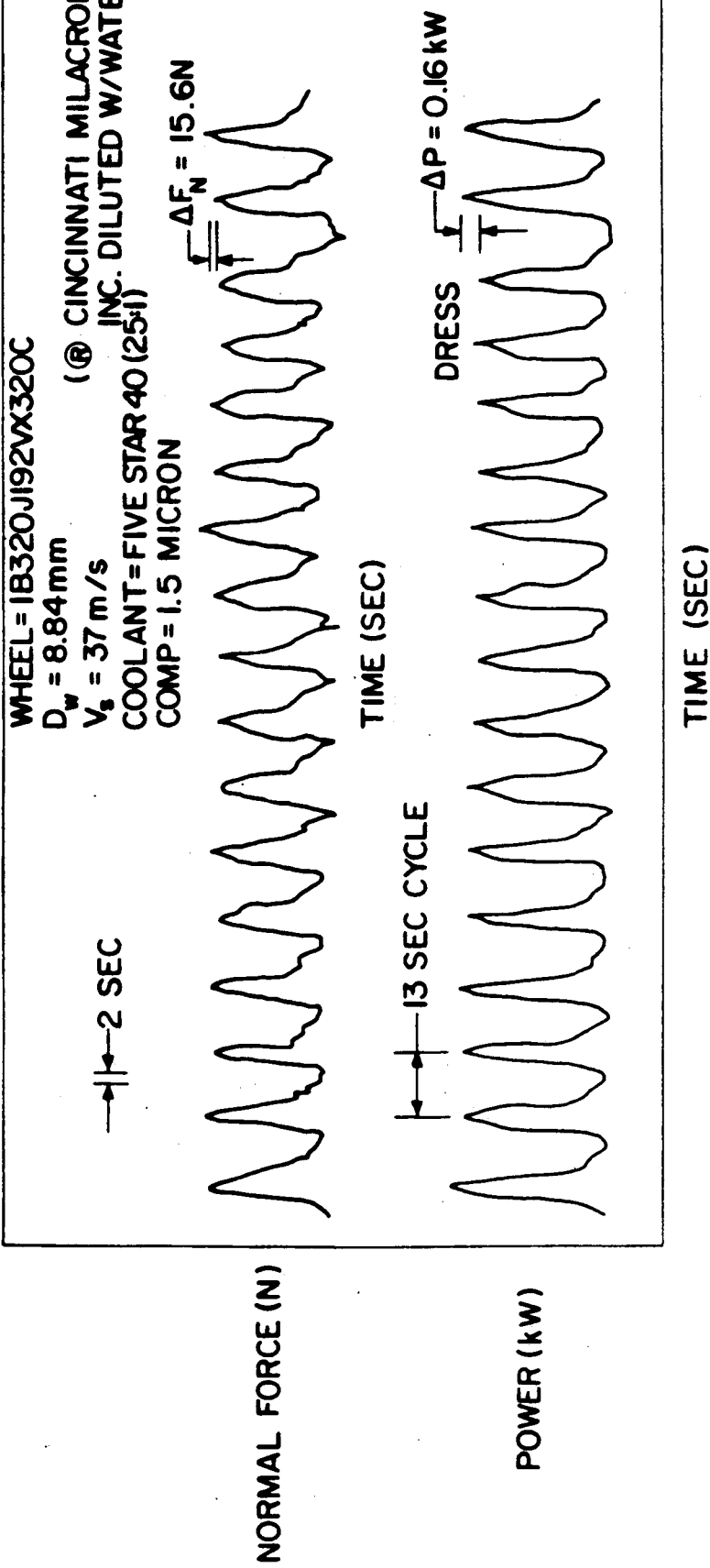
FIG. 13 is a plot of a CBN grinding pattern, plotting normal force ($F_n$) and power ($K_w$) versus time (sec.)

The flow chart of FIGS. 11, 12 and 12a show a preferred production grinding cycle controlled in response to monitored normal force, and including a gap eliminator rate as contemplated above. In particular. FIG. 11 shows the contemplated sequence of implementing the grinding machine and process of the subject's invention wherein a workpiece 12 and a grinding wheel 17 are loaded into a grinding machine such as shown in FIG. 1. If this is the first grind after trueing, dressing, or loading of a new grinding wheel, the initial values for lambda and the threshold force ($F_{th}$) are used. If this is not the first grind, the measured values for these parameters are used. A target grind force ($F_t$) and an initial ramp rate (IRR) are initially set based upon experience factors and/or historical data concerning a particular type and grade of grinding wheel, and the grinding wheel and workpiece are moved relative one another at the gap eliminator rate mentioned above. This gap eliminator rate is implemented until the normal force monitored by loadcell 22 indicates when a small contact force between the workpiece and wheel has been sensed.

- As set forth in FIG. 11, during the grinding process, the maximum normal force ($F_{n-max}$) and the minimum normal force ($F_{n-min}$) is monitored and recorded for each revolution of workpiece 12. The feed rate can be changed after each revolution as necessary in inverse proportion to the relationship of the maximum normal force to the target grind force ($F_t/F_{n-max}$). In this way, the feed rate is automatically adjusted to quickly ramp up to the target force, thereby optimizing the grinding process by insuring that grinding is undertaken at the optimum normal force according to the condition of the grinding wheel during each revolution of the workpiece.

The minimum normal force monitored during any particular revolution is also utilized to insure that a minimum force level ($F_{clean}$) has been met (i.e. to insure that the grinding wheel has made contact with the entire inside diameter surface of the workpiece). Once the minimum normal force exceeds the $F_{clean}$ force level, measurements can be commenced to calculate the values of lambda in accordance with the discussion above. This data is monitored for each revolution of the workpiece until the grinding wheel has reached the finished size position as indicated by the x-axis slide position. As will be discussed below, in order to insure that the cut part has been rounded up prior to reaching its finished size, the subroutine shown in FIG. 12a is preferably implemented.

When the x-axis slide has reached the finished position, the feed is stopped, and spark-out to a maintained normal force condition ($F_{th}$) ensues. The normal force measurements can be ended when the feed has been stopped, or can be continued to monitor spark-out force to the threshold normal force. Thereafter, a new value for lambda is calculated based upon the information collected during the grinding cycle, and this new value of lambda and the measured value of the threshold force ($F_{th}$) will be used for the next grinding cycle. As set forth in FIG. 12, following a grind cycle, a skip dress counter is incremented, and the machine determines whether the grinding wheel must be dressed. A need for dressing the grinding wheel may be indicated after a pre-determined number of parts have been ground, or when the calculated value of lambda for the grinding wheel exceeds a predetermined critical value. A critical value for lambda can be predetermined based upon experience or data concerning values for lambda above which the wheel may break down in use or lose shape or size due to excessive bond erosion.

FIG. 12 also illustrates the additional advantage of the unique normal force monitoring capabilities of the present invention, as normal force of contact between a reshaping tool and the grinding wheel can be monitored to insure that these procedures are properly completed. Moreover, the grinding wheel topography or geometry can be determined or "mapped" based upon the normal force values indicated during the dressing and/or trueing procedures. It is contemplated that such mapping can be accomplished either transversely across the grinding surface of a wheel, or circumferentially about the periphery of the wheel to insure roundness. With appropriate machine response capabilities, by varying the feed movement in accordance with the values of the normal forces monitored, the reshaping process can be optimized by minimizing the normal forces in areas of the grinding wheel where reshaping is not needed.

Out-of-Roundness Detection

The load cell 22 may also be used for sampling variations in normal force around the grind periphery, and thereby determine out-of-roundness of the workpiece 12. In tests, as many as 30 intermittent force values have been sampled on the periphery of workpiece 12. Again, in machines with appropriate response capabilities, the infeed can be varied in proportion to the sampled force values to round-up the workpiece 12. A preferred procedure for determining and compensating for out-of-roundness is shown in FIG. 12a.

As mentioned above, before the grinding wheel has reached the finished size position, it is important to insure that the workpiece has been rounded up. Therefore, it is preferred that before the finished size position is reached, the maximum normal force ($F_{n-max}$) for each revolution of the workpiece compared with a normal force limit value which has been preset into the machine (e.g., a normal force value 20 lbs. higher than the constant force or target grind force, $F_{tar}$, established for that grind cycle). If the maximum normal force exceeds this safety limit, the feed is stopped, as there may be some problem with the machine. In actual use, the maximum normal force will never exceed this normal force limit unless there is a problem which must be addressed by the operator.

As long as the maximum normal force is less than the normal force limit, the feed rate is optimized during each revolution of the workpiece by adjusting the feed rate in inverse proportion to how close the maximum normal force ($F_{n-max}$) is to the target normal force ($F_{tar}$). The system keeps track of the force during each grind cycle by accumulating the maximum and minimum normal forces monitored during each revolution during the grind cycle, and averaging these forces for use in determining the value of lambda. The roundness of a part being ground is determined by dividing the difference between the maximum and minimum normal forces experienced in a particular revolution by the stiffness of the system (K), which is a known constant. The amount of run-out is compared with a pre-determined run-out tolerance limit set in the machine, and if the run-out in the part is less than the tolerance, a roundness flag is set in the software so that it is known that the roundness requirement is met.

It should be noted that the unique adjustment of feed rate provided by this system can be used to help insure that the part will be ground to roundness prior to running out of stock. It is contemplated that the normal force monitored can be utilized to compare the amount of run-out indicated in the part to the amount of stock left in the part, so that the machine can slow down the feed rate to insure that the part is rounded within the grinding and spark-out portions of the process. This advantage enables more efficient production of parts and reduction of rejects.

Figure 16:
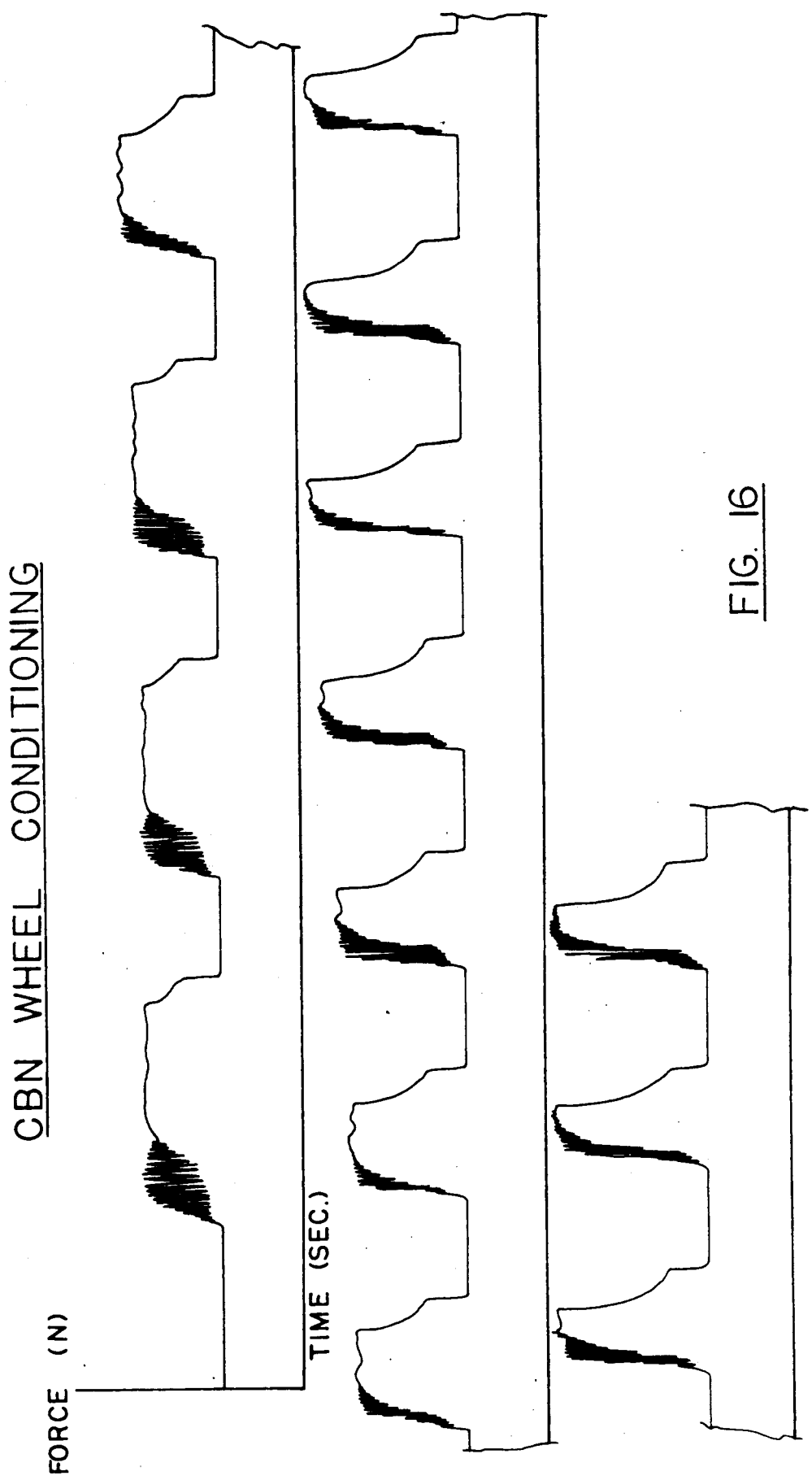
FIG. 16 is an enlarged plot of a plurality of CBN grinding force patterns, illustrating the enhanced round-up capabilities and process optimization as the wheel conditions, of the present invention.

FIG. 16 graphically illustrates tracings of controlled force grindings undertaken in accordance with the subject invention, and the automatic conditioning process provided by this grinding apparatus. In particular, the first tracing of FIG. 16 shows the first grind after a dressing procedure, and illustrates graphically the rounding-up process described above. In particular, the darker initial areas of the tracing represent the normal forces monitored, wherein the maximum normal forces are substantially higher than the minimum normal forces. The tracings of FIG. 16 correspond to the normal force tracing shown and described with regard to FIG. 3b, and illustrate how various parts having different run-out are rounded up relatively quickly by the present controlled grinding process, and well prior to spark-out. The tracings of FIG. 16 further illustrate the self-conditioning process of the present invention wherein the normal forces are automatically optimized as discussed.

While the invention has been shown and described in connection with a preferred embodiment, it is not intended that the invention be so limited; rather, the invention extends to all designs and modifications as come within the scope of the appended claims.

What is claimed is:

1. A grinding machine having a machine base, a wheelhead supported by said machine base for carrying a rotatable superabrasive grinding wheel means for relatively feeding said wheel and workpiece at a feed rate along a normal force vector therebetween, and an apparatus for automatically controlling grinding processes for individual workpieces, said apparatus further comprising:
   means for relatively rotating said workpiece while said wheel and workpiece are in contact;
   means for measuring the magnitude of the normal force vector occurring between said wheel and said workpiece through substantially at least one revolution of said workpiece, said measuring means including a force transducer mounted adjacent said wheelhead;
   means for sampling said normal force vector at a plurality of intervals during said at least one revolution and determining workpiece runout therefrom; and
   means for automatically varying said feed rate during a grinding process in response to the determined workpiece runout such that optimal normal force can be applied during each revolution of the workpiece to insure that the workpiece will be ground to desired roundness.

2. The grinding machine of claim 1, wherein said force transducer includes a piezoelectric element.

3. The grinding machine of claim 1, wherein said force transducer includes a load cell affixed to said wheelhead.

4. The grinding machine of claim 1, wherein said force transducer is located between the wheelhead and said base.

5. A method for automatically optimizing grinding of individual workpieces with a superabrasive grinding wheel in a grinding machine, said method including the steps of:
   (a) rotating a workpiece to be ground on a workhead;
   (b) rotating a superabrasive grinding wheel on a wheelhead;
   (c) effectuating relative feed movement between said workhead and wheelhead to cause contact of said wheel with said workpiece, said movement being set at an initial feed rate;
   (d) providing a normal force transducer for detecting normal contact force between said wheel and workpiece;
   (e) monitoring said normal contact force at a plurality of points about the periphery of said workpiece during individual revolutions thereof while grinding;
   (f) utilizing the monitored normal contact forces to determine the topography about said periphery of the workpiece; and
   (g) automatically varying the feed rate during grinding in response to the determined topography such that optimal normal force can be applied during each revolution of said workpiece to correct the out-of-roundness of the topography of said workpiece.

6. The method of claim 5, wherein step (d) includes locating said normal force transducer within a wheelhead mounting member.

7. The method of claim 6, wherein step (d) further includes using a piezoelectric load cell as said normal force transducer.

8. The grinding machine of claim 1, wherein said means for automatically varying the feed rate further comprises means for comparing determined topography of a workpiece to a set of predetermined runout tolerance within which the roundness of each workpiece must be ground.

9. The grinding machine of claim 8, wherein said means for automatically varying the feed rate comprises means for comparing the determined topography of said workpiece against the amount of stock left in said workpiece, whereby said feed rate may be adjusted to insure that said workpiece is ground within said runout tolerances prior to running out of stock.

10. The method of claim 5, further comprising the step of setting a predetermined tolerance range for out-of-roundness of the workpiece into the grinding machine, whereby correction of out-of-roundness of each workpiece will be insured to within said range.

11. The method of claim 5, further comprising the step of comparing the determined topography of said workpiece with the amount of stock remaining in said workpiece such that said feed rate can be varied accordingly to insure that the out-of-roundness of said workpiece will be corrected during the grinding process.

12. The method of claim 5, wherein said feed rate is automatically adjusted to provide the maximum normal force which will correct the out-of-roundness of said workpiece during the grinding process.

13. The method of claim 5, wherein the out-of-roundness of said workpiece is automatically determined by dividing the difference between the maximum and minimum monitored normal contact forces in any particular revolution of said workpiece by the stiffness of the grinding machine.

* * * * *